United States Patent [19]

Ito et al.

[11] Patent Number: 5,691,737
[45] Date of Patent: Nov. 25, 1997

[54] SYSTEM FOR EXPLAINING AN EXHIBIT USING SPECTACLE-TYPE DISPLAYS

[75] Inventors: Ryo Ito; Akira Shimazu, both of Tokyo, Japan

[73] Assignee: Sony Corporation, Tokyo, Japan

[21] Appl. No.: 306,099

[22] Filed: Sep. 14, 1994

[30] Foreign Application Priority Data

Sep. 21, 1993 [JP] Japan ..................... 5-233962

[51] Int. Cl.$^6$ .............. G09G 5/00; G08C 19/00
[52] U.S. Cl. ........................... 345/8; 340/825.72
[58] Field of Search ............. 345/7, 8; 340/825.44, 340/825.72, 825.73, 825.24; 348/53, 158; 455/186.1

[56] References Cited

U.S. PATENT DOCUMENTS

| 3,216,778 | 11/1965 | Davies et al. |
| 3,787,109 | 1/1974 | Vizenor |
| 3,923,370 | 12/1975 | Mostrom |
| 4,034,401 | 7/1977 | Mann |
| 4,081,209 | 3/1978 | Heller et al. |
| 4,153,913 | 5/1979 | Swift |
| 4,163,123 | 7/1979 | Brodsky et al. |

(List continued on next page.)

FOREIGN PATENT DOCUMENTS

| 0344881 | 2/1989 | European Pat. Off. |
| A0344881 | 2/1989 | European Pat. Off. |
| 0599406 | 3/1993 | European Pat. Off. |
| A0559406 | 3/1993 | European Pat. Off. |
| A2612351 | 3/1987 | France |
| A3127669 | 1/1983 | Germany |
| 3517819 | 5/1985 | Germany |
| A3517819 | 5/1985 | Germany |
| A3517818 | 11/1986 | Germany |
| A3518667 | 11/1986 | Germany |
| A3519494 | 12/1986 | Germany |
| 2195868 | 4/1988 | United Kingdom |
| WO8401680 | 9/1983 | WIPO |
| WOA8401680 | 9/1983 | WIPO |
| WO9106158 | 10/1990 | WIPO |
| WOA9106158 | 10/1990 | WIPO |
| WOA9301665 | 1/1993 | WIPO |
| WOA9316550 | 8/1993 | WIPO |
| WO9411855 | 10/1993 | WIPO |
| WOA9411855 | 10/1993 | WIPO |
| 9411967 | 5/1994 | WIPO |
| WOA9411967 | 5/1994 | WIPO |

OTHER PUBLICATIONS

Patent Abstracts of Japan, vol. 14, No. 524 (E-1003) AB. Date: 16 Nov. 1990, Pat.: A 2220575, Imanaga Eisuke, "Portable Television Set for Face Mount".

Patent Abstracts of Japan, vol. 14, No. 85 (E-0890), AB. Date: 16 Feb. 1990, Pat: A 1295577, Kawasaki Heavy Ind Ltd., Atsuta Toshio, "Universal Type Liquid Crystal Television Receiver".

Patent Abstracts of Japan, vol.11, No. 292, (E-543)AB. Date:19 Sep. 1987, Pat:A 62090061, Sumitomo Electric Ind Ltd, 24 Apr. 1987, Y.Mikio "Method for Transmitting Voice Information".

*Primary Examiner*—Richard Hjerpe
*Assistant Examiner*—Paul A. Bell
*Attorney, Agent, or Firm*—Charles M. Fish, Esq.; Pasquale Musacchio, Esq.; Jerry A. Miller

[57] ABSTRACT

An exhibit explaining system to enable a plurality of visitors to receive an explanation of an exhibit at their own pace. Spectacle-type displays 51-1 to 51-10 are provided, the frequencies f1 to f10 of a carrier wave being set to be different from each other. Image generating devices 61-1 to 61-10 are provided to correspond to the spectacle-type displays 51-1 to 51-10. When operating explanation request button 52-1 of the spectacle-type display 51-1, a VTR 76-1 of the image generating device 61-1 with the corresponding channel is reproduced, which is output from a transmitter-receiver circuit 72-1 to the spectacle-type display 51-1 through an antenna 71-1 on a radio wave. In the spectacle-type display 51-1, this radio wave is demodulated to observe an image on an LCD thereof.

31 Claims, 26 Drawing Sheets

U.S. PATENT DOCUMENTS

| | | |
|---|---|---|
| 4,257,062 | 3/1981 | Meredith . |
| 4,310,849 | 1/1982 | Glass . |
| 4,457,019 | 6/1984 | Szabo, Jr. et al. . |
| 4,516,157 | 5/1985 | Campbell . |
| 4,559,555 | 12/1985 | Schoolman . |
| 4,636,866 | 1/1987 | Hattori ........................................... 345/8 |
| 4,706,117 | 11/1987 | Schoolman ................... 348/53 |
| 4,751,691 | 6/1988 | Perera . |
| 4,753,514 | 6/1988 | Kubik . |
| 4,786,966 | 11/1988 | Hanson et al. ........................... 348/158 |
| 4,805,988 | 2/1989 | Dones ......................................... 348/53 |
| 4,806,011 | 2/1989 | Bettinger . |
| 4,830,464 | 5/1989 | Cheysson et al. . |
| 4,853,764 | 8/1989 | Sutter . |
| 4,874,235 | 10/1989 | Webster . |
| 4,933,755 | 6/1990 | Dahl et al. . |
| 4,952,024 | 8/1990 | Gale . |
| 4,984,179 | 1/1991 | Waldern . |
| 4,994,794 | 2/1991 | Price et al. . |
| 5,003,300 | 3/1991 | Wells ........................................... 345/8 |
| 5,034,809 | 7/1991 | Katoh . |
| 5,060,062 | 10/1991 | Dotson . |
| 5,097,252 | 3/1992 | Harvill et al. . |
| 5,129,716 | 7/1992 | Holakovszky et al. . |
| 5,152,003 | 9/1992 | Poch ...................................... 455/186.1 |
| 5,162,828 | 11/1992 | Furness et al. . |
| 5,193,208 | 3/1993 | Yokota et al. ..................... 340/825.24 |
| 5,276,471 | 1/1994 | Yamauchi et al. .......................... 345/8 |
| 5,281,957 | 1/1994 | Schoolman ................................. 345/8 |
| 5,461,371 | 10/1995 | Matsumoto et al. ............... 340/825.72 |
| 5,469,185 | 11/1995 | Lebby et al. ................................. 345/8 |

SYSTEM FOR EXPLAINING AN EXHIBIT USING SPECTACLE-TYPE DISPLAYS

FIELD OF THE INVENTION

The present invention relates to a system for explaining an exhibit which is suitable for use in, for example, museums, art galleries, etc. More particularly, the present invention relates to a system for explaining such an exhibit using personal spectacle-type displays, in the preferred embodiment.

BACKGROUND

When viewing a museum or art gallery exhibit (or the like), not only is the exhibit directly viewed, but an explanation plate is often provided which describes the exhibit. In this ease, visitors can read the explanation plate to improve comprehension of the exhibit. A method of providing an audible explanation from a speaker is also sometimes used. However, such methods lack visual appeal.

In view of this, a method of carrying out an explanation by use of both sounds and images by, for example, television receivers is also proposed. In this case, since an explanation is carried out by both a sound and an image, it is possible to provide a deeper comprehension of the content of the exhibit.

However, the use of a conventional television receiver, etc. requires that a plurality of persons watch and listen to the explanation at the same time. In addition, viewers will often need to wait through several viewings of the explanation in order to see the full explanation. This results in an inability to appreciate the exhibit at one's own pace.

The present invention is made in view of these problems, and enables a plurality of visitors to receive an explanation of an exhibit at their own individual pace.

SUMMARY OF THE INVENTION

According to the present invention, a plurality of image generating devices including video tape players or video disk players or the like is provided which transmits an explanation of the exhibit to a personal spectacle-type display device. The user operates a switch when he is ready to see an explanation of the exhibit. Various embodiments of the invention are provided.

One system for explaining an exhibit according to the present invention includes a plurality of spectacle-type displays and a plurality of image generating devices which are provided. An image of the exhibit explanation is output from the plurality of image generating devices at predetermined frequencies, and the outputs of the predetermined frequencies are received by the plurality of spectacle-type displays so as to display in display portions thereof the image of the exhibit.

In accordance with various embodiments of the invention, the predetermined frequencies can be varied with the plurality of image generating devices. Moreover, the frequencies are selected by persons who use the plurality of spectacle-type displays, respectively, or the image generating devices can automatically select unused frequencies.

Moreover, according to some embodiments, the image of the exhibit is varied with classes, and the classes can be determined with the spectacle-type displays, or selected by persons who use the spectacle-type displays. That is, varying classes of explanation may be provided so that a user can see an explanation which is appropriate to his level of understanding of the subject matter (or according to the user's age, etc.).

In other embodiments, the spectacle-type displays can be switchable between either of a state wherein the user can view the outside and a state wherein the user sees the display. Other variations in the invention are also contemplated.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DESCRIPTION OF THE INVENTION

Figure 1:
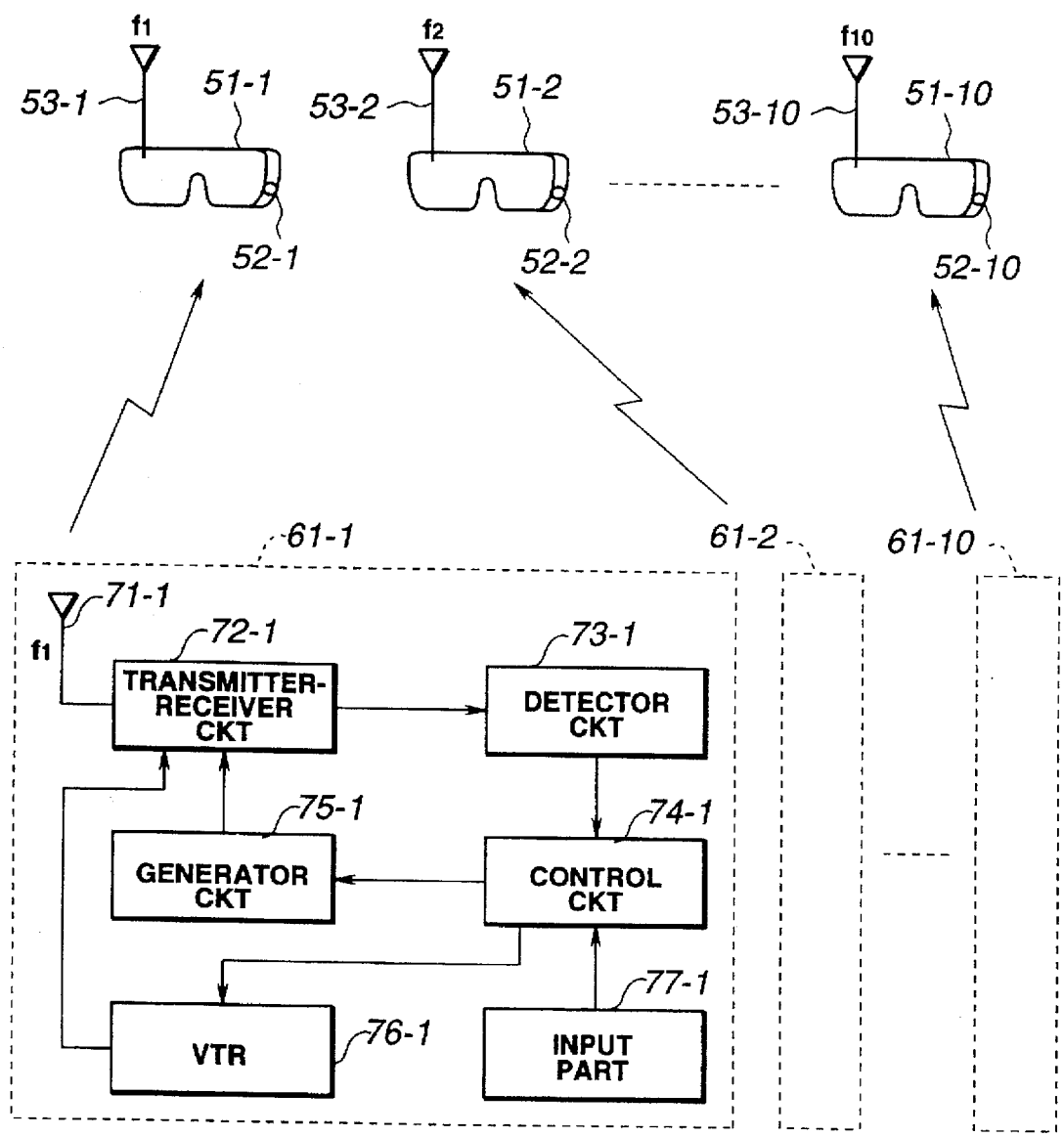
FIG. 1 is a block diagram of an embodiment of a system for explaining an exhibit of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

FIG. 1 is a block diagram showing a first embodiment of a system for explaining exhibits of the present invention. In this embodiment, a plurality (10 in the embodiment) of spectacle-type displays 51 (51-1 to 51-10) are provided. The spectacle-type displays 51 have explanation request buttons 52 (52-1 to 52-10) and antennas 53 (53-1 to 53-10). These ten spectacle-type displays 51-1 to 51-10 are constructed to be capable of receiving information carried by a radio wave to be transmitted on a carrier wave with carrier frequencies f1 to f10 which are different from each other. In other embodiments, information could equivalently be carried by other mechanism such as infra-red or spread spectrum channels which would equivalently provide ten separate information channels.

A visitor who enters the museum, art gallery, etc. borrows or rents any one of the spectacle-type displays 51-1 to 51-10. The display is placed on the visitor's head allowing him to view the exhibit explanations.

Disposed in positions corresponding to predetermined exhibits in the building are a plurality of image generating devices 61 (61-1 to 61-10) corresponding in number to the number of spectacle-type displays 51. Each of the image generating devices 61-1 to 61-10 have essentially the same constitution, respectively.

Transmitter-receiver circuits 72 (72-1 to 72-10) have antennas 71 (71-1 to 71-10), and output signals received through the antennas 71 are provided to detector circuits 73 (73-1 to 73-10). The detector circuits 73 detect predetermined signals encoded in the signals received by the transmitter-receiver circuits 72, which are output to control circuits 74 (74-1 to 74-10). The control circuits 74 are constructed by, for example, microcomputers, etc., and perform predetermined operations in response to the inputs from input parts 77 (77-1 to 77-10). Generator circuits 75 (75-1 to 75-10) which are controlled by the control circuits 74 generate predetermined signals which are supplied to the transmitter-receiver circuits 72 and output through the antennas 71 in the form of waves. VTRs 76 (76-1 to 76-10) (or other sources of video such as laser disks) which are controlled by the control circuits 74 reproduce images recorded on magnetic tapes as contained, which are supplied to the transmitter-receiver circuits 72 and output through the antennas 71 in the form of radio waves. Of course, VTRs 76 could equivalently be video disk players or other predetermined sources of audio and video information.

The image generating devices 61-1 to 61-10 transmit and receive signals on a radio carrier wave with the frequencies f1 to f10, respectively, or equivalently, on otherwise separated communication channels.

Figure 2:
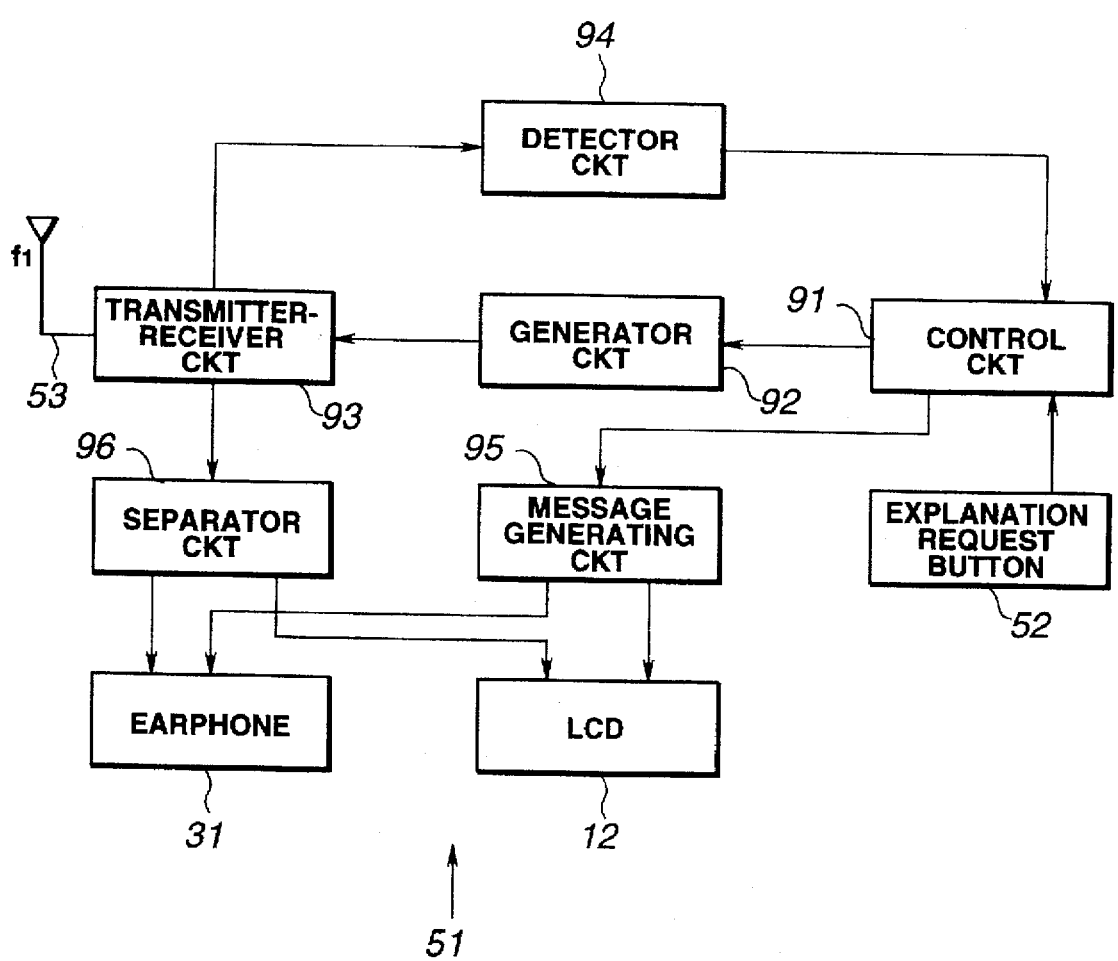
FIG. 2 is a diagram of a spectacle-type display 51 in the embodiment in FIG. 1.

FIG. 2 shows a block diagram of an embodiment of the spectacle-type displays 51. A transmitter-receiver circuit 93 carries out FM demodulation of a signal received through the antenna 53, which is output to a detector circuit 94. The detector circuit 94 detects a predetermined signal out of the signal as input, which is output to a control circuit 91. When the explanation request button 52 is operated, the control circuit 91 as constructed by, for example, a microcomputer, etc. controls a generator circuit 92 to generate a predetermined signal which is supplied to the transmitter-receiver circuit 93. The control circuit 91 controls a message generating circuit 95 so as to supply a message comprising sound (e.g. a phonetic sound) to earphones 31 and output a message comprising an image (character) to LCDs 12.

Moreover, supplied to the earphones 31 and the LCDs 12 respectively are an audio signal and an image signal, separated by a separator circuit 96, of the signal received by the transmitter-receiver circuit 93 through the antenna 53.

Figure 3:
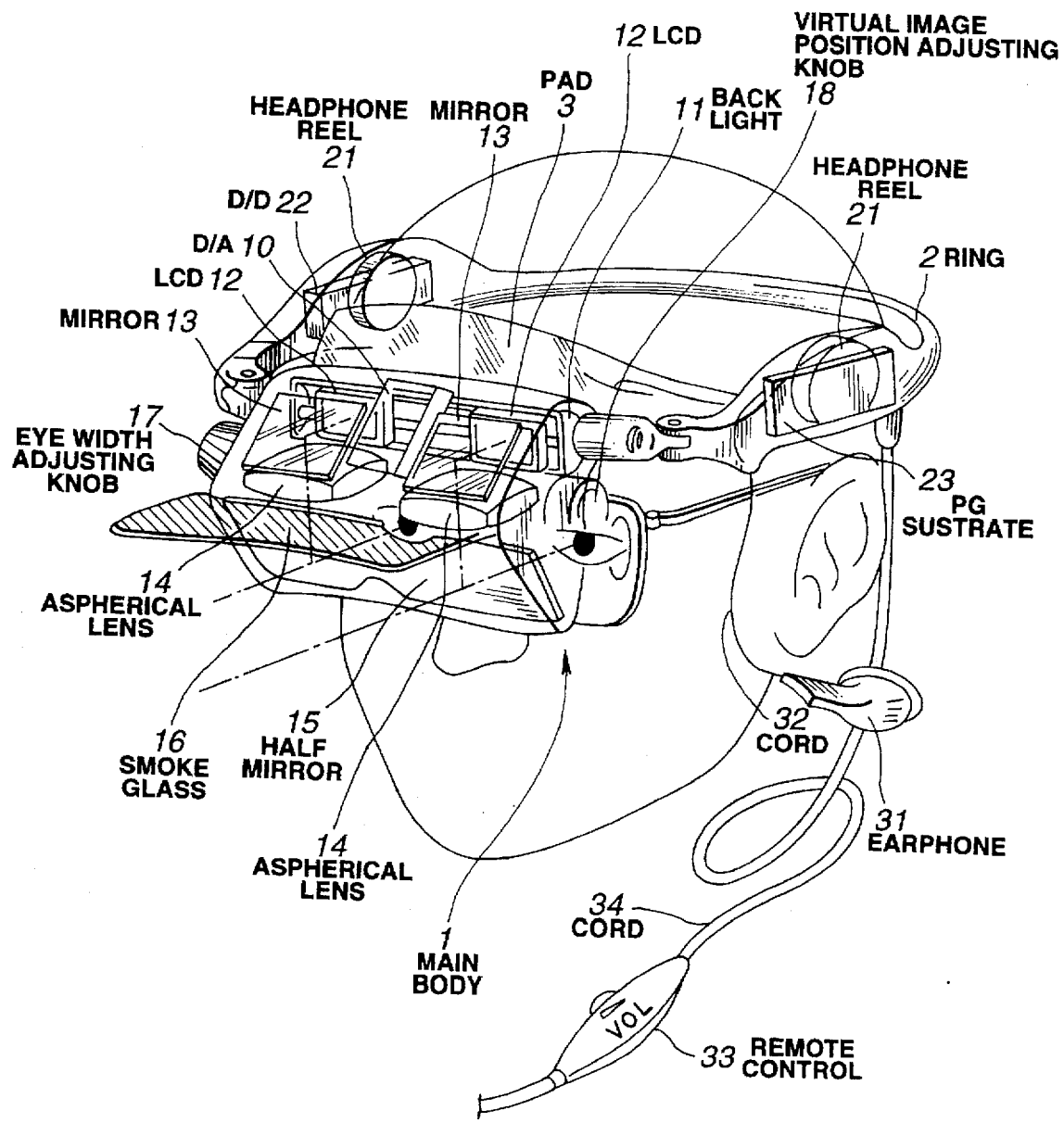
FIG. 3 is a perspective view showing the used state of the spectacle-type display 51 in FIG. 1.

FIG. 3 shows a more detailed diagram of the spectacle-type display 51, especially, an optical system thereof. Such displays may be constructed in a manner similar to that shown in greater detail, for example, in U.S. patent applications Ser. Nos. 08/240,554 and 08/243,705 filed May 11, 1994 and May 17, 1994 which are hereby incorporated by reference. This spectacle-type display 51 is constructed essentially by a main body 1 and a ring 2. A pad 3 is arranged to the main body 1 on the back thereof. By applying the pad 3 to a forehead of an user (visitor) and putting the ring 2 at the back of a head thereof, a person can wear the spectacle-type display 51 in a manner similar to putting spectacles on.

A back light 11 is arranged to the main body 1 so as to light up the LCDs 12 from behind which are arranged on the left and right thereof. The left one of the LCDs 12 displays a left eye image signal, whereas the right one thereof displays a right eye image signal. The images as displayed on the LCDs 12 are reflected by mirrors 13 arranged opposite to the left and right LCDs 12, then by a half mirror 15, coming in eyes of the user who wears the spectacle-type display 51. At this time, the image as displayed on the left eye LCD 12 comes in the left eye of the user, whereas the image as displayed on the right eye LCD 12 comes in the right eye of the user.

A pair of left and right aspherical lenses 14 are arranged between the pair of left and right mirrors 13 and the half mirror 15 so that the images as displayed on the left and right eye LCDs 12 are enlarged and formed in the eyes of the user, respectively.

A smoke glass 16 is rotatably arranged in from of the half mirror 15. When the smoke glass 16 is put in the open state as shown in FIG. 3, the user can see the outside through the half mirror 15 as the need arises. To see the image of the LCDs 12 reflected by the half mirror 15 or to see the outside can automatically be selected by which one the user focuses on. When it is unnecessary to see the outside, the smoke glass 16 is closed so that a light from the outside does not come in the half mirror 15, enabling the images on the LCD 12 to be seen more clearly.

An eye width adjusting knob 17 is arranged to the main body 1 on a right side face thereof. By regulating this eye width adjusting knob 17, the horizontal distance between the aspherical lenses 14 as disposed on the left and right thereof can be adjusted to his own eye width, i.e., the distance between both eyes.

Moreover, a virtual image position adjusting knob 18 is arranged to the main body 1 on a left side face thereof. By rotating and regulating this virtual image position adjusting knob 18, the distance between the LCDs 12 and the aspherical lenses 14 in the optical axis can be varied. By this, the position of a virtual image can be regulated (diopter adjustment). Specifically, when regulating this virtual image position adjusting knob 18, the user's eyes can perceive the images displayed on the LCDs 12 as images which actually exist in a position 3 meters away from him, or as images which actually exist in a position 1 meter away from him. This distance can be regulated by operating the virtual image position adjusting knob 18.

A D/A converter 10 is disposed between the left and right mirrors 13. This D/A converter 10 outputs electric power for driving the back light 11. Electric power for driving the back light 11 is relatively high in voltage, so that its disposition in a position too away from the back light 11 is disadvantageous in view of withstand voltage. Therefore, in this embodiment, it is disposed near the back light 11 and between the pair of mirrors 13 as shown in FIG. 3.

Headphone reels 21 are arranged to the ring 2 on left and right side faces thereof so as to properly take up cords 32 of the left and right earphones 31. A D/D converter 22 is accommodated in a right side face of the ring 2. This D/D converter 22 serves to supply DC voltage necessary to each part of the spectacle-type display 51. Moreover, as shown in FIG. 2, a circuit for processing the image signals and an RG substrate 23 having a driver for driving the LCDs 12, etc. are accommodated in a left side face of the ring 2.

In one embodiment, a remote control 33 is connected to the left side face of the ring 2 through a cord 34. By operating the remote control 33, the user can regulate the audio signal output to the earphones 31 and the image displayed on the LCDs 12.

Figure 4:
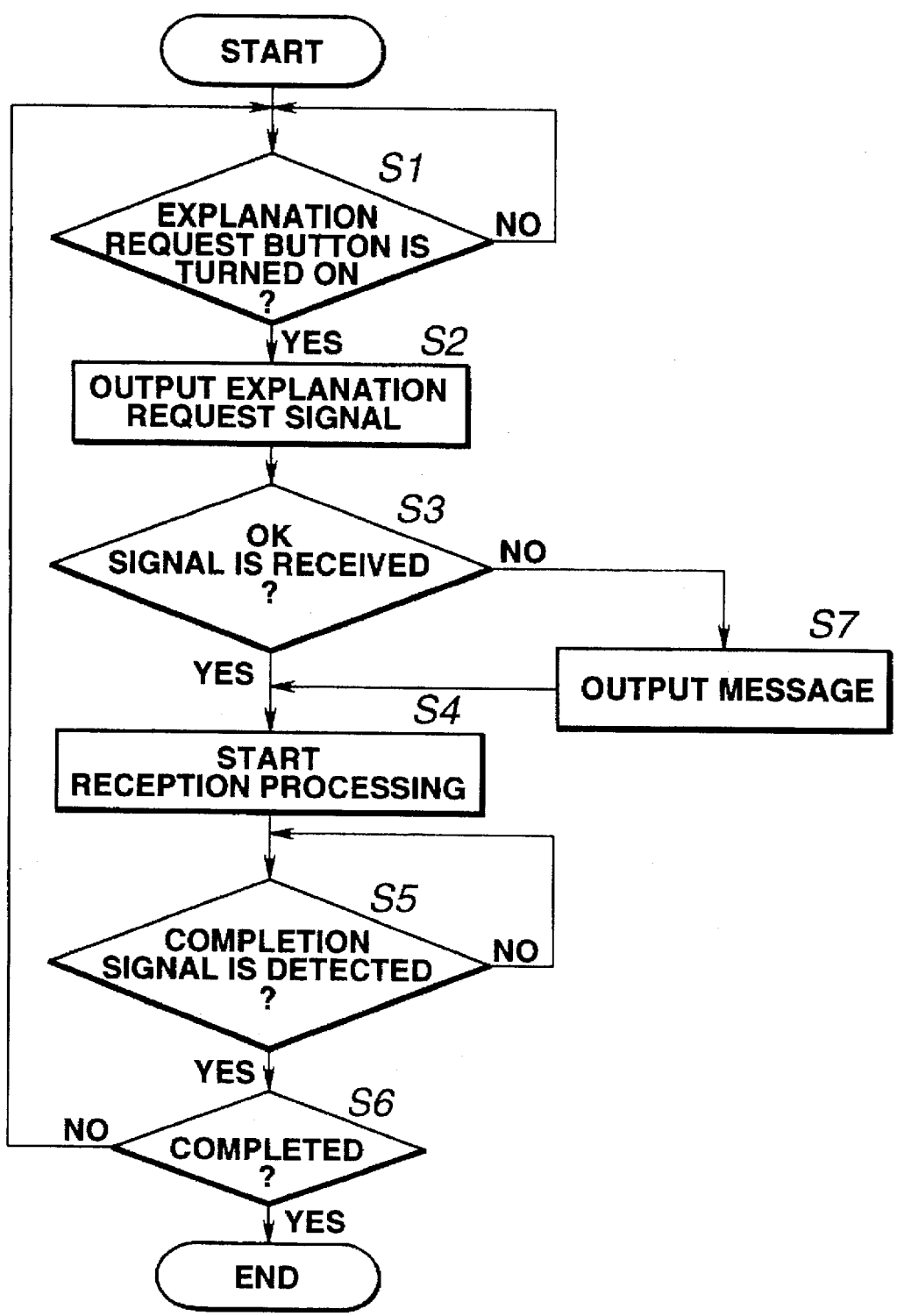
FIG. 4 is a flow chart explaining the operation of the spectacle-type display 51 in FIG. 1.

Referring next to flow charts in FIGS. 4 and 5, the operation of the spectacle-type display 51 and the image generating device 61 will be explained. FIG. 4 explains the operation of the spectacle-type display 51, whereas FIG. 5 explains the operation of the image generating device 61.

When a spectator who wears the spectacle-type display 51 on his head as shown in FIG. 3 goes in front of a predetermined exhibit, and operates the explanation request button 52, at a step S1 in FIG. 4, a signal corresponding to the operation of the explanation request button 52 is input to the control circuit 91. Next, the flow proceeds to a step S2 where an explanation request signal output command is executed. That is, the control circuit 91 controls the generator circuit 92 to output an explanation request signal. This explanation request signal is input to the transmitter-receiver circuit 93, which is frequency-modulated on a carrier wave with a frequency f1, and output from the antenna 53 as a radio wave. This radio wave is received by the image generating device 61-1 as will be described later (step S11 in FIG. 5).

As will be describe later, if the image generating device 61-1 is in the unused state when detecting the explanation request signal, it outputs an OK signal (step S13 in FIG. 5).

Then, the spectacle-type display 51-1 which outputted the explanation request signal determines, at a step S3, whether or not the OK signal output by the corresponding image generating device 61-1 can be received. Since the corresponding image generating device 61-1 is in the unused state when the OK signal can be received, its VTR 76-1 outputs the image signal (step S14 in FIG. 5). Then, in the spectacle-type display 51-1, at a step S4, the VTR 76-1 of the image generating device 61-1 starts a reception processing of the signal as reproduced and output.

Specifically, the transmitter-receiver circuit 72-1 of the corresponding image generating device 61-1 outputs, as an FM radio wave, a reproduced image of the VTR 76-1 on a carrier wave f1. Then, in the spectacle-type display 51-1, this radio wave with the carrier wave f1 is received by the transmitter-receiver circuit 93 through the antenna 53 so as to perform FM demodulation.

When detecting the OK signal out of the demodulated signal output by the transmitter-receiver circuit 93, the detector circuit 94 outputs the detected signal to the control circuit 91. When inputting the detected signal of the OK signal, the control circuit 91 makes the transmitter-receiver circuit 93 receive the image signal.

The transmitter-receiver circuit 93 carries out FM demodulation of the signal as received, which is output to the separatist circuit 96. The separator circuit 96 separates the signal as input into the vocal signal and the image signal, the vocal signal being output to the earphones 31 and the image signal being output to the LCDs 12. By this, the user can watch and hear the vocal or other audio signal and the image signal related to the exhibit and recorded on the magnetic tape of the VTR 76 by the earphones 31 and the LCDs 12.

The image as displayed on the LCDs 12 is reflected by the mirrors 13, which is observed by the eyes of the user through the aspherical lenses 14 and the half mirror 15. The user watches the image on the LCDs 12 as a virtual image formed by the aspherical lenses 14.

Since the left LCD 12 and the right LCD 12 display different images each having constituents corresponding to the diopter, the user perceives the images (virtual image) displayed on the left and right LCDs 12 as a stereoscopic image.

At this time, if the smoke glass 16 is put in the closed state so that an outside light falls to come in the half mirror 15 from the front thereof, the images as displayed on the LCDs 12 can be seen more clearly.

When moving from one exhibit to the next exhibit, for example, this smoke glass 16 is put in the open state, enabling the user to see outside through the half mirror 15. This helps to prevent accidental collisions. Moreover, this saves the trouble of removal of the spectacle-type display 51 from the head between exhibits.

Next, the flow proceeds to a step S5 where a wait function is carded out until a reproduction completion signal is detected. Specifically, as described later, when completing a reproduction of the magnetic tape, the image generating device 61 outputs the reproduction completion signal (step S16 in FIG. 5). When the image generating device 61 outputs the reproduction completion signal, this signal is detected by the detector circuit 94, which is supplied to the control circuit 91. When this detected signal is input to the control circuit 91, the flow proceeds to a step S6 where it is determined whether or not a completion of a reception operation is commanded. If a completion is not commanded, the flow returns to the step S1 to repeatedly carry out the subsequent processing.

In the manner described above, when the corresponding image generating device 61 is in the unused state, an explanation can be listened to by operating the explanation request button 52. However, when the corresponding image generating device 61 is in the used state, i.e., when there is the other person who wears the spectacle-type display 51 with the same frequency f1 and has already watched and listened to an explanation, the OK signal is not output since a processing at the step S13 in FIG. 5 is skipped.

Then, if it is determined at the step S3 in FIG. 4 that the OK signal cannot be detected, the flow proceeds to a step S7 where a predetermined message is output. That is, at this time, the control circuit 91 controls the message generating circuit 95 to output a predetermined message as a vocal signal and an image signal.

By way of example, this message can be "Another person is watching and listening to this explanation. If you want to watch and listen to the explanation from the beginning, please push the explanation request button again after the current explanation is finished". Of course, other messages can also be used.

After outputting such message, the flow proceeds to a step S4 where a reception processing is started. That is, at this time, an explanation which the other person using the spectacle-type display 51 with the same frequency f1 has started to watch and listen to is supplied to a person who operates now the explanation request button 52. That is, at this time, the user watches and listens to an explanation from it's current position in the explanation.

Referring next to a flowchart in FIG. 5, the operation of the image generating device 61 will be explained. First, at a step S11, a wait is done until the explanation request signal is detected. This system uses a carrier wave with ten frequencies f1 to f10. However, each image generating device 61-1 receives only the carrier wave with the corresponding frequency f1, so that even if the spectacle-type display 51 with a different frequency (channel) outputs the explanation request signal, this signal is not detected.

When the carrier wave with the corresponding frequency is received by the transmitter-receiver circuit 72, a demodulated signal with this frequency is supplied to the detector circuit 73. The detector circuit 73 determines a presence of the explanation request signal out of the signal as input. If the explanation request signal exists, this detected signal is output to the control circuit 74.

When the control circuit 74 receives the input of the detected signal of the explanation request signal, the flow proceeds to a step S12 where it is determined whether or not the VTR 76 is actually in reproduction. If the VTR is not in reproduction, the flow proceeds to a step S13 where an OK signal output processing is executed. That is, it controls the generator circuit 75 to output the OK signal. This OK signal is supplied to the transmitter-receiver circuit 72, which is frequency-modulated on the carrier wave with the frequency f1, and output through the antenna 71 as a radio wave. As described above, this radio wave is detected by the spectacle-type display 51 with the corresponding channel (frequency) (step S3 in FIG. 4).

Next, at a step S14, the reproduction operation of the VTR 76 is started. That is, the control circuit 74 controls the VTR 76 to begin reproduction of the magnetic tape as contained. This reproduced signal is supplied to the transmitter-receiver circuit 72, which is frequency-modulated, then output through the antenna 71 as a radio wave. This radio wave is received in the transmitter-receiver circuit 93 of the spectacle-type display 51 with the corresponding channel, which is separated into the vocal signal and the image signal, and output to the earphones 31 and the LCDs 12 (step S4 in FIG. 4).

Further, at a step S15, a wait is done until the reproduction operation is completed. Upon completion of the reproduction, the flow proceeds to a step S16 where the reproduction operation is stopped to rewind the magnetic tape to the starting point, and the reproduction completion signal is output. Specifically, at this time, the control circuit 74 controls not only the VTR 76 to stop the reproduction operation so as to rewind the magnetic tape to the start point, but the generator circuit 75 to output the reproduction completion signal. This reproduction completion signal is output to the spectacle-type display 51 through the transmitter-receiver circuit 72 and the antenna 71, and detected by the spectacle-type display 51 (step S5 in FIG. 4). Those skilled in the art will understand that the above process should be modified when the image generating device is a non-linear device capable of random access (such as a video disk player).

Next, the flow proceeds to a step S17 where if a completion of the operation is not commanded, the flow returns to the step S11 to repeatedly execute the subsequent processing.

At the step S12, if it is determined that the VTR 76 is actually in reproduction (in the play mode), the processing at the steps S13 and S14 are skipped. That is, the OK signal is not output, so that the flow proceeds to a step S15 where a wait is done until the VTR 76 of which a reproduction has already started is completed. Therefore, as described above, the reproduced image of the VTR 76 is displayed from the current position for the user who operates now the explanation request button 52, whereas the reproduced state is continued for the other user who watches the reproduced image from the beginning.

Figure 6:
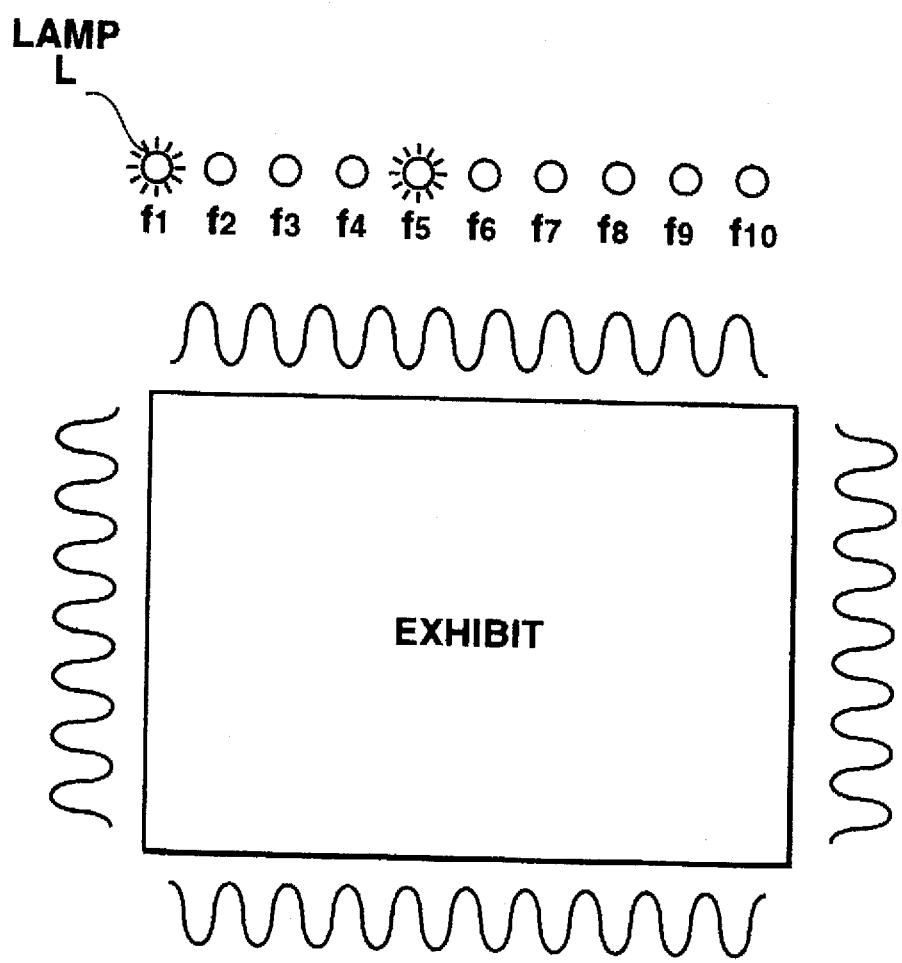
FIG. 6 is a view explaining the used state of each channel.

In this state, as shown in FIG. 6 for example, it is possible to arrange lamps L having the number corresponding to the channels (frequencies f1 to f10) wherein the lamp L corresponding to the channel as used actually is turned on.

Figure 7:
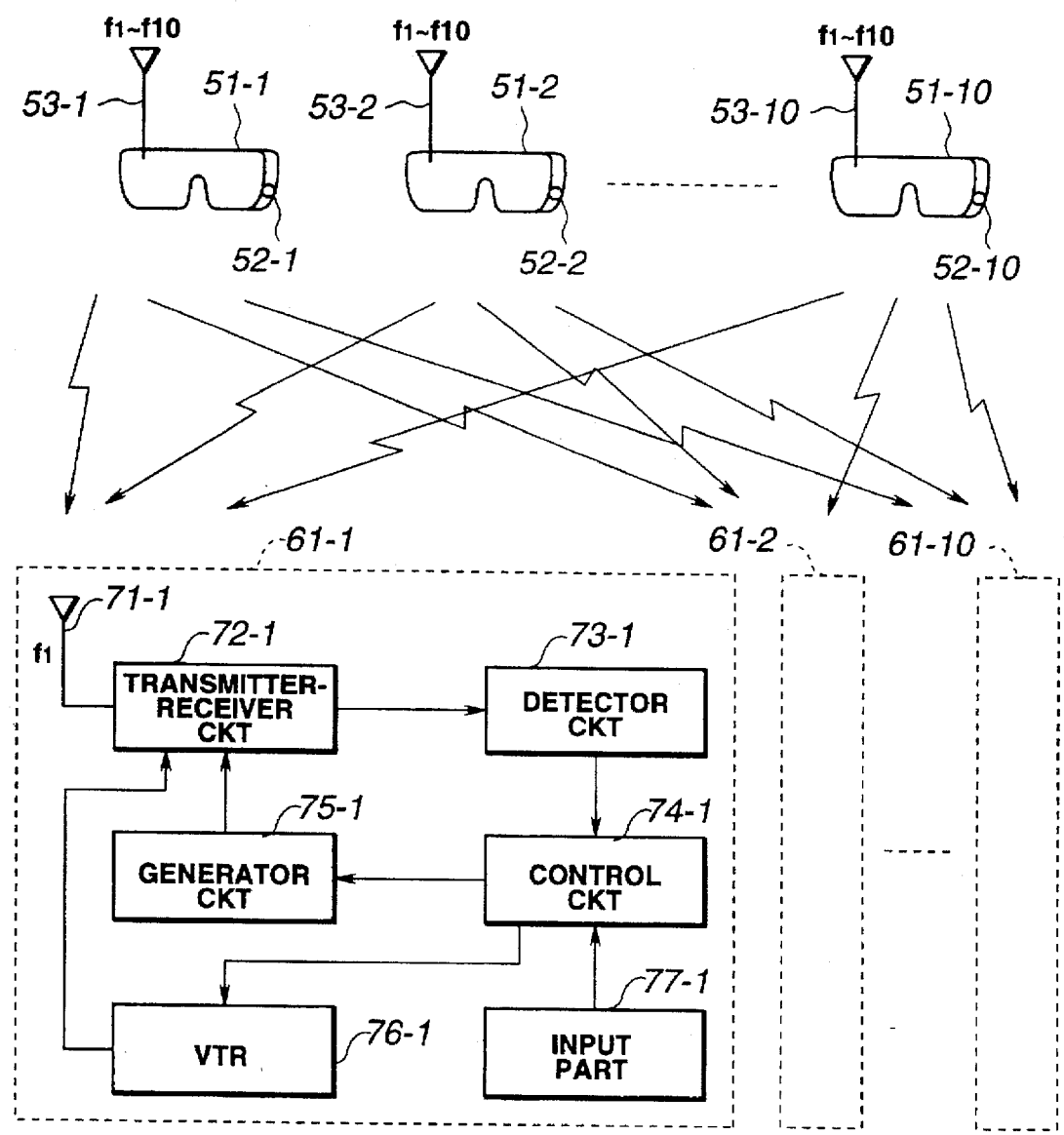
FIG. 7 is a block diagram showing another embodiment of a system for explaining an exhibit of the present invention.

FIG. 7 shows an embodiment of another exhibit explanation system of the present invention. In this embodiment, the spectacle-type display 51-1 is constructed to be capable of receiving a signal on any one of the ten frequencies f1 to f10 of a carrier wave.

Figure 8:
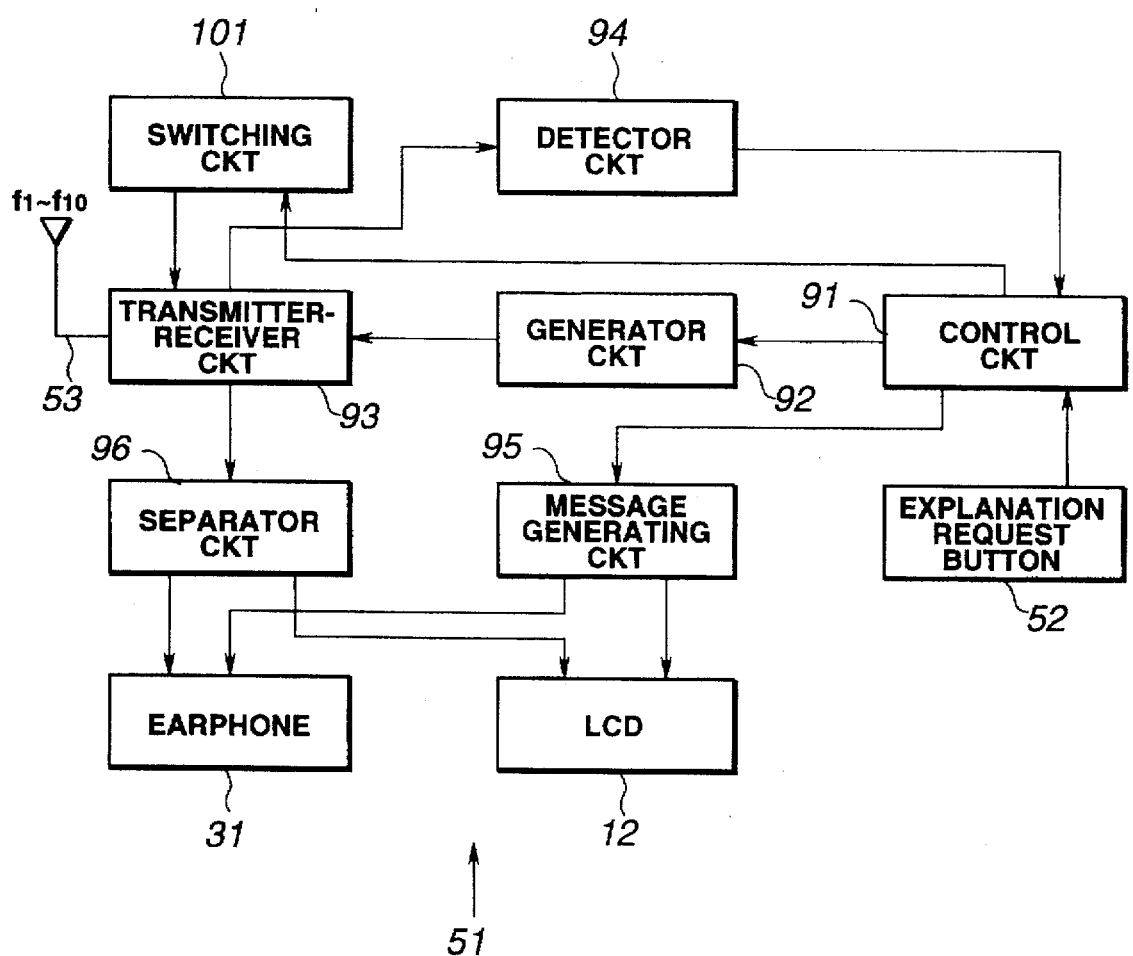
FIG. 8 is a block diagram showing an example of the spectacle-type display 51 in the embodiment in FIG. 7.

FIG. 8 shows an example of a block diagram of a spectacle-type display 51 for use in the system as shown in FIG. 7. As shown in the drawing, in this embodiment, it is constructed so that the control circuit 91 carries out the control, and a switching circuit 101 switches the frequency of the carrier wave transmitted and received by the transmitter-receiver circuit 93 to any of the frequencies f1 to f10. The remaining circuit blocks operate the same as corresponding blocks in FIG. 2.

Referring next to flow charts in FIGS. 9 and 10, the operation of the spectacle-type display 51 and the image generating device 61 will be explained.

Figure 9:
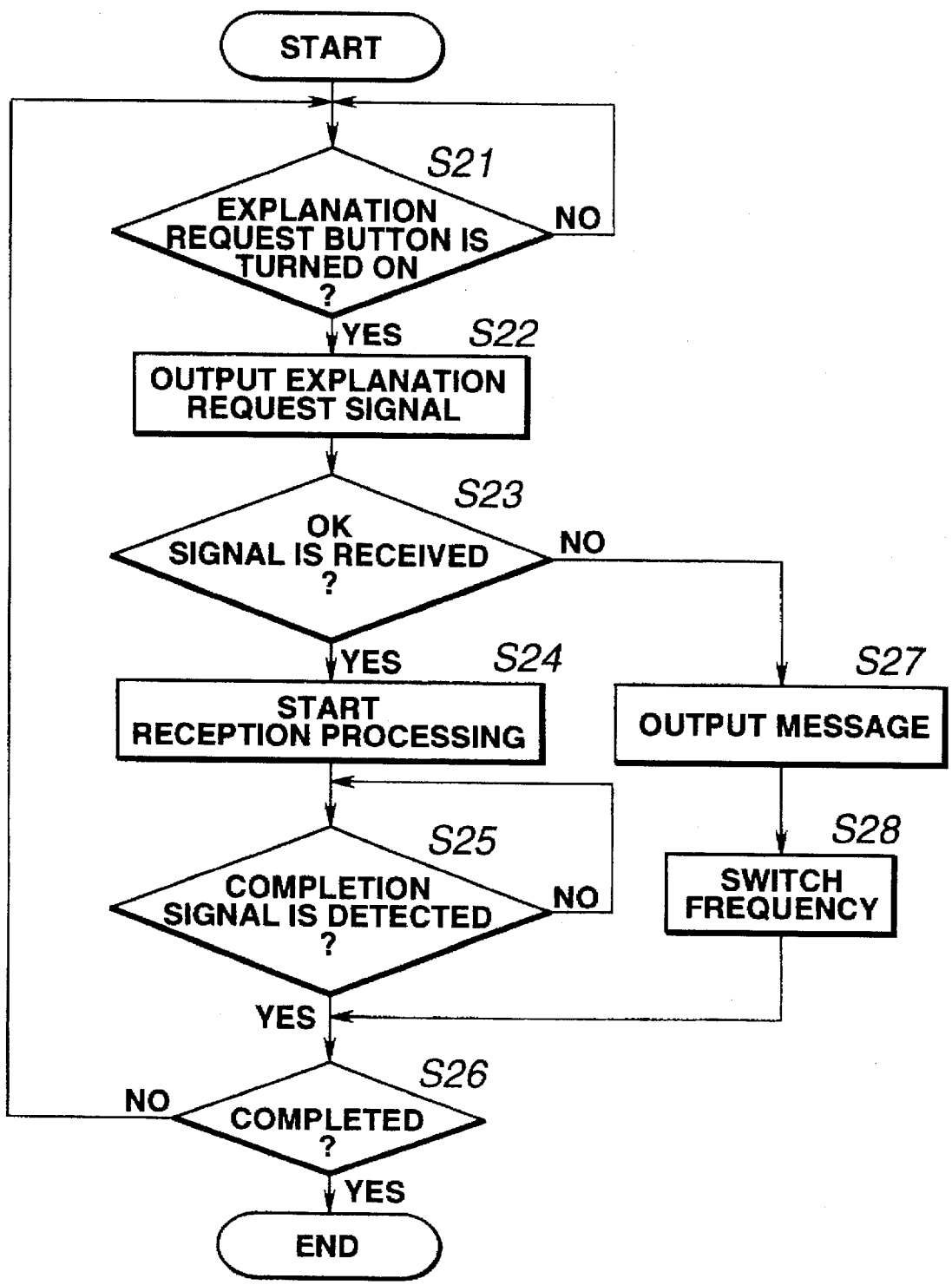
FIG. 9 is a flow chart explaining the operation of the spectacle-type display 51 in FIG. 7.
Figure 10:
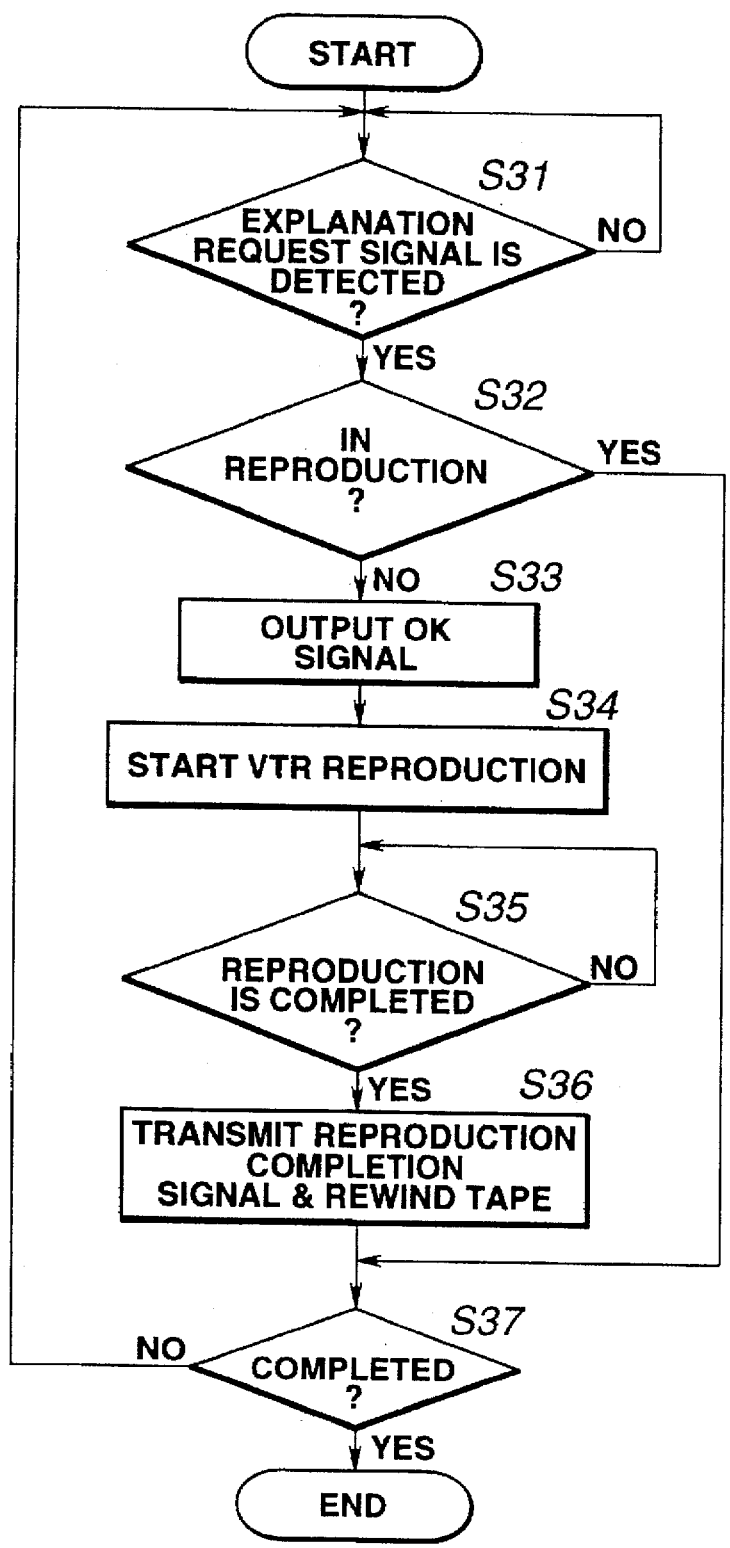
FIG. 10 is a flow chart explaining the operation of the image generating device 61 in the embodiment in FIG. 7.

FIG. 9 shows the operation of the spectacle-type display 51, and processing from a step S21 to a step S26 are the same as those at the step S1 to the step S6 in the flowchart in FIG. 4. That is, when the user operates the explanation request button 52, the explanation request signal is output on the carrier wave with the frequency f1 as initially set (used just before). If the corresponding image generating device 61 is in the unused state, the OK signal is output (step S33 in FIG. 10), so that when receiving this OK signal, an explanation on this carrier wave is received.

However, when the corresponding image generating device 61 is in the used state, this OK signal is not received, so that the flow proceeds to the step S23 and then to a step S27 where message output processing is executed. Specifically, at this time, the control circuit 91 controls the message generating circuit 95 to output to the LCDs 12 and the earphones 31, for example, a message such as "This channel is in use, please operate the explanation request button again to use another channel".

The flow proceeds to a step S28 where a frequency switching processing is executed. Specifically, at this time, the control circuit 91 controls a switching circuit 101 to switch a frequency (channel) of the transmitter-receiver circuit 93 to the other one. And, at a step S26, when it is determined that a completion of the processing is not commanded, the flow returns to the step S21 where a wait is done until the explanation request button 52 is mined on. That is, when watching and listening to the message output at the step S27, the user turns on the explanation request button 52 again to change the channel. Then, the same processing is repeatedly carried out in the channel switched at the step S28.

As described above, when the channel is in use, a switching to the other channel is sequentially carried out by operating the explanation request button 52.

Referring next to the flowchart in FIG. 10, the operation of the image generating device 61 will be explained. The processing from step S31 to step S37 in FIG. 10 is essentially the same as the processing from step S11 to step S17. That is, when the explanation request signal is detected, it is determined whether or not the corresponding VTR 76 is in reproduction. If it is not in reproduction, the OK signal is output to reproduce the VTR. And, when a reproduction is completed, the reproduction completion signal is transmitted, and a processing to rewind the magnetic tape is executed.

However, at the step S32, when it is determined that the corresponding VTR 76 is in reproduction, the flow proceeds to a step S37 where if a completion of the processing is not commanded, the flow returns to the step S31 again to repeatedly carry out the processing from the beginning.

Figure 5:
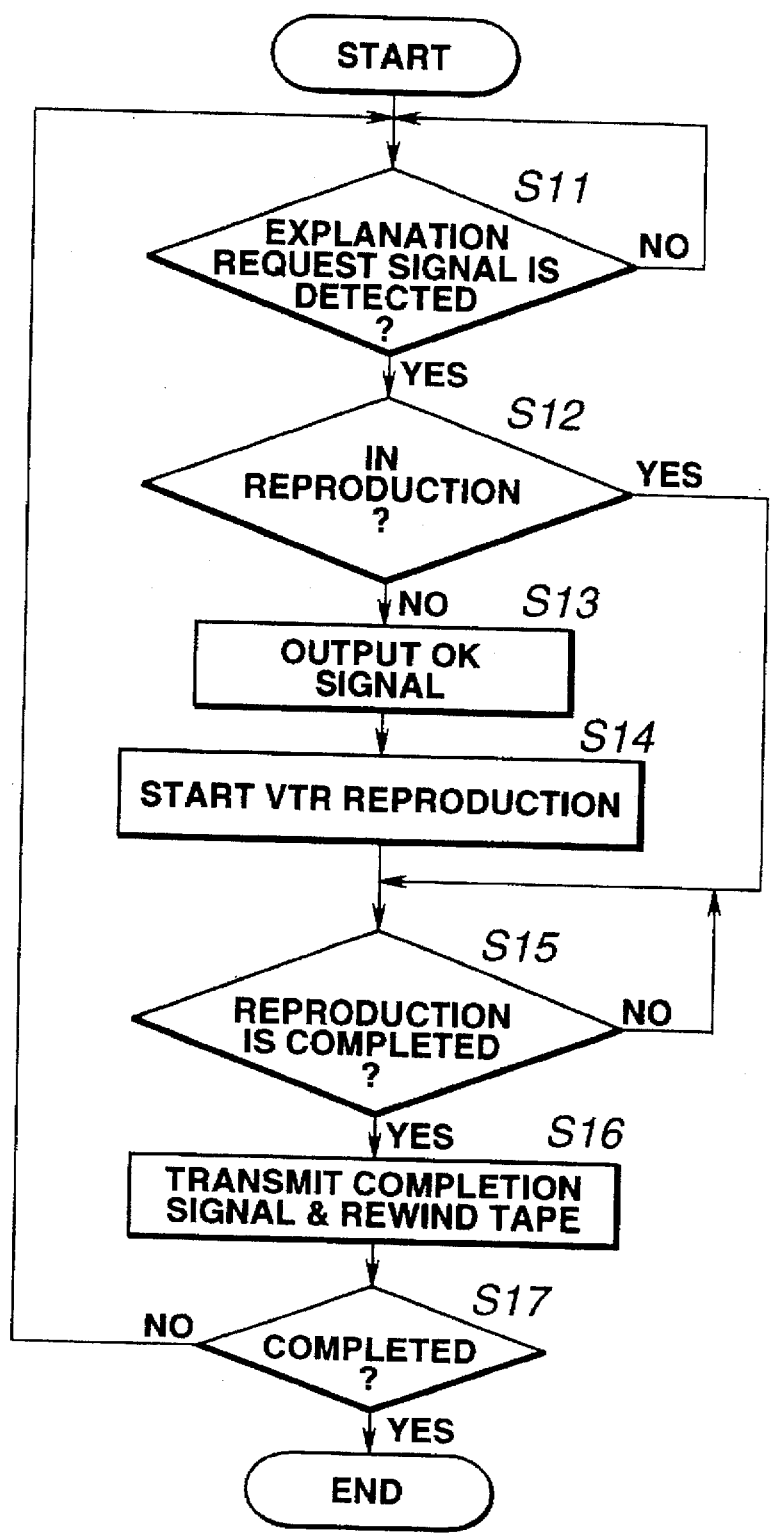
FIG. 5 is a flow chart explaining the operation of an image generating device 61 in FIG. 1.

Specifically, in the embodiment in FIG. 5, at the step S12, when it is determined that the corresponding VTR 76 is in reproduction, the flow proceeds to the step S15 where the signal which is actually in reproduction is also provided to the other user for watching and listening from halfway. On the other hand, in the embodiment in FIG. 10, when the corresponding VTR 76 is in reproduction (play mode), it is not provided to the other user for watching and listening, and the flow returns to the step S31 where the user has to operate the explanation request button 52 again, and have a wait until the explanation request signal of the other channel is received.

Figure 11:
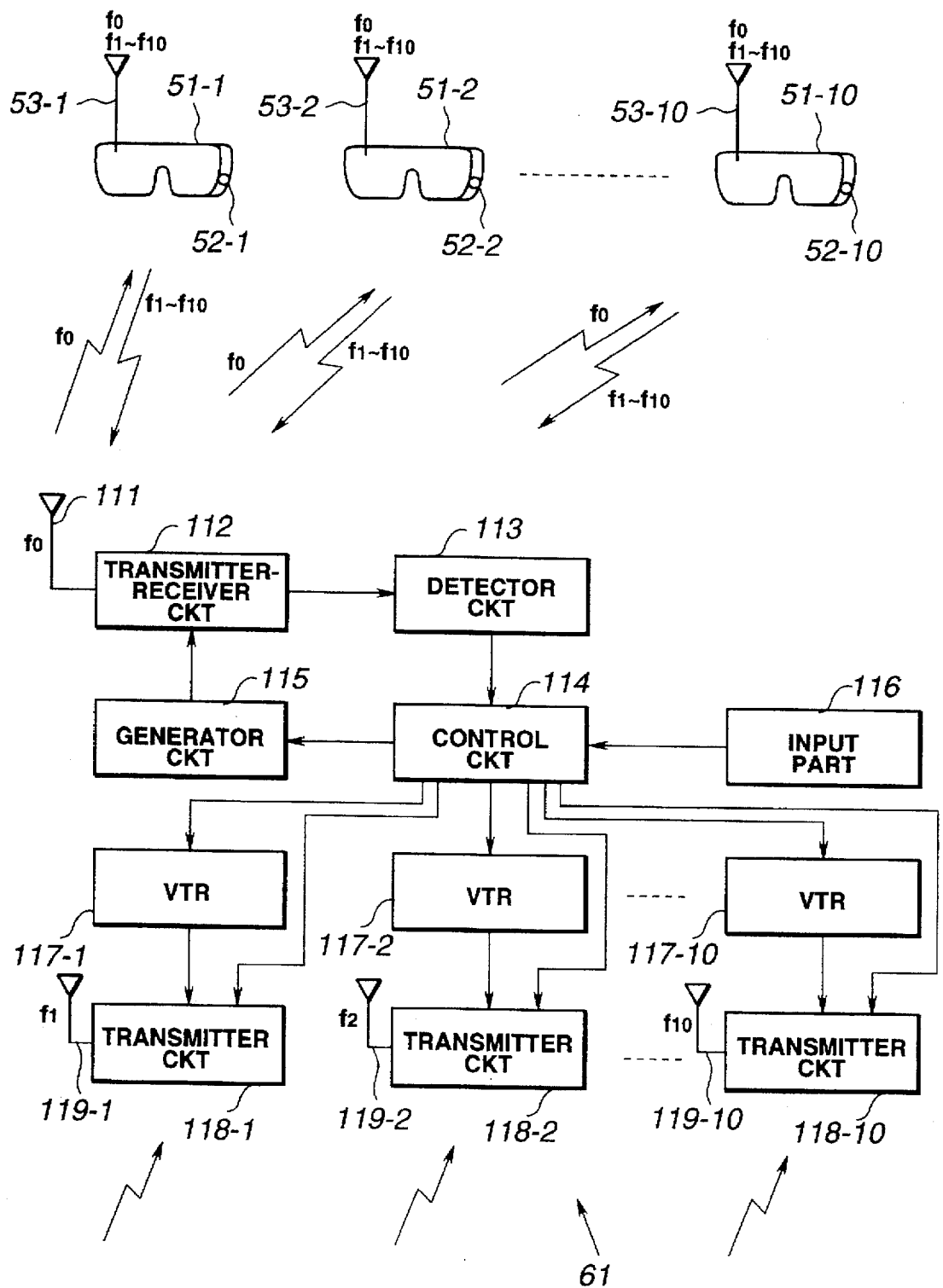
FIG. 11 is a block diagram showing another embodiment of a system for explaining an exhibit of the present invention.
Figure 12:
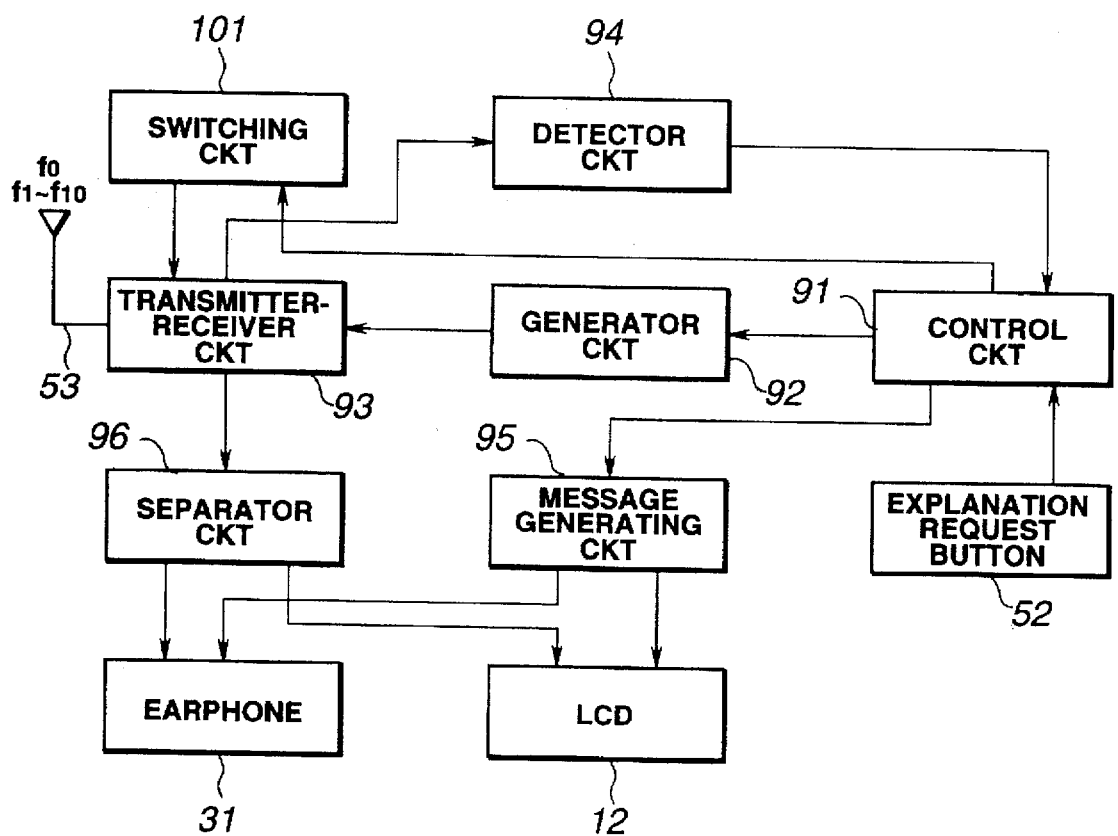
FIG. 12 is a block diagram showing the spectacle-type display 51 in FIG. 11.

FIG. 11 shows another embodiment of a system for explaining an exhibit. In this embodiment, the spectacle-type display 51 receives the image signal of an explanation on the carrier wave with the frequencies f1 to f10, and transmits and receives various control signals on the carrier wave with the frequency f0. Therefore, as shown in FIG. 12, in addition to f1 to f10, the frequency of the carrier wave which the transmitter-receiver circuit 93 transmits and receives through the antenna 53 can be switched to f0 by the switching circuit 101. The other constitution is the same as a case in FIG. 8.

Moreover, the image generating device 61 in this embodiment is provided with the VTRs 117-1 to 117-10 for a plurality of channels, and is constructed so that their reproduced signals are output by transmitter circuits 118-1 to 118-10 through antennas 119-1 to 119-10 on the carrier wave with the frequency f1 to f10.

These plurality of channels are controlled by a single control circuit 114. A predetermined input can be supplied to this control circuit 114 by operating an input part 116. A generator circuit 115 is controlled by the control circuit 114 to generate a predetermined signal which is output to a transmitter-receiver circuit 112. The transmitter-receiver circuit 112 carries out frequency modulation of the signal as input, which is output on the carrier wave with the frequency f0 through an antenna 111. Moreover, the transmitter-receiver circuit 112 carries out FM demodulation of the signal received through the antenna 111, which is supplied to a detector circuit 113. The detector circuit 113 detects a predetermined signal out of the signal as input, which is output to the control circuit 114.

Figure 13:
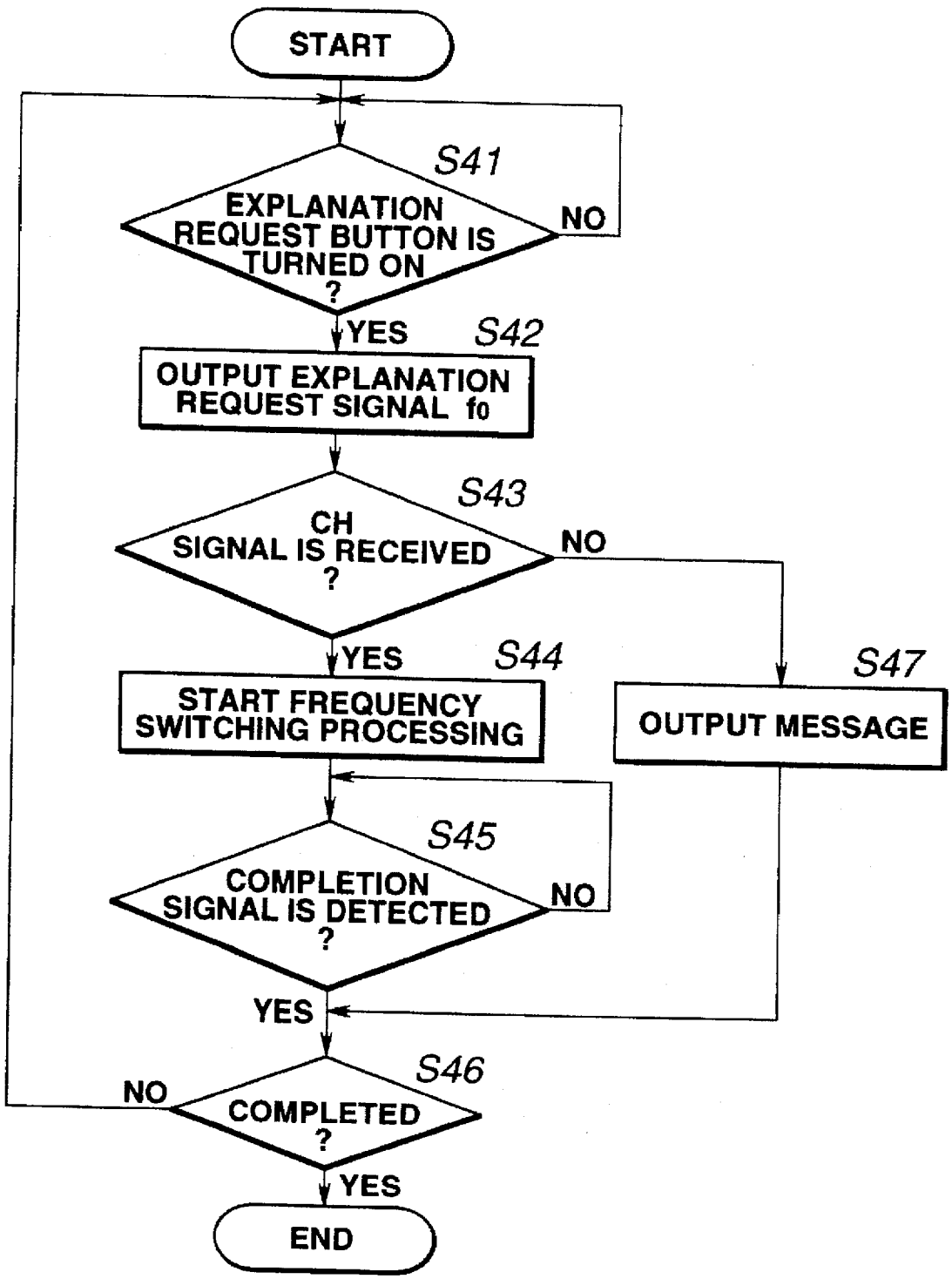
FIG. 13 is a flow chart explaining the operation of the spectacle-type display 51 in the embodiment in FIG. 11.

Referring next to flow charts in FIGS. 13 and 14, its operation will be explained. FIG. 13 shows the operation of the spectacle-type display 51. First, at a step 841, a wait is done until the user operates the explanation request button 52. When the explanation request button 52 is operated, the flow proceeds to a step S42 where an explanation request signal output processing is executed. That is, at this time, the control circuit 91 controls the generator circuit 92 to output the explanation request signal. Moreover, at this time, the control circuit 91 controls the switching circuit 101 so as to make the transmitter-receiver circuit 93 carry out frequency modulation of the explanation request signal input from the generator circuit 92 on the carrier wave with the frequency f0, which is output through the antenna 53.

As will be described later in referring to FIG. 14, when receiving this explanation request signal, the control circuit 114 of the image generator device 61 searches the reproducible VTR 117-1 (vacant channel) to output its channel signal (step S53). In the spectacle-type display 51, it is determined whether or not the channel signal (CH) is received at a step S43. When receiving the channel signal, the flow proceeds to a step S44 where the frequency of carrier wave as received is switched, and a reception processing of this carrier wave is started.

Specifically, when the image generating device 61 transmits the channel signal (CH) on the carrier wave with the frequency f0, this signal is received by the transmitter-receiver circuit 93 through the antenna 53. The transmitter-receiver circuit 93 carries out FM demodulation of the channel signal as received, the demodulation output being supplied to the detector circuit 94. The detector circuit 94 detects the channel signal out of the signal as input, which is output to the control circuit 91. When receiving the input of this detected signal, the control circuit 91 decodes its channel, and controls the switching circuit 101 to make the transmitter-receiver circuit 93 switch the frequency to receive the frequency of the carrier wave corresponding to the channel, and start the reception.

At a step S45, a wait is done until the reproduction completion signal is detected. That is, since the image generating circuit 61 transmits the reproduction completion signal at a step S56 when a reproduction of the VTR 117-1 is completed after starting the reproduction, a wait is done until this signal is detected. That is, the transmitter-receiver circuit 93 receives the carrier wave with the frequency f1, and when containing therein the reproduction completion signal, the detector circuit 94 outputs this detected signal to the control circuit 91. When the control circuit 91 receives the input of the detected signal of this reproduction completion signal, the flow proceeds to a step S46 where if a processing completion is not commanded, the flow returns to the step S41 again to repeatedly execute the subsequent processing.

At the step S43, if it is determined that the channel signal (CH) cannot be received, the flow proceeds to a step S47 where a message output processing is executed. That is, when a vacant channel does not exist, the control circuit 114 of the image generating circuit 61 does not output the channel signal. Then, when failing to receive the channel signal within a preset time after the output of the explanation request signal, the control circuit 91 controls the generator circuit 92 to output to the LCDs 12 and the earphones 31 a message such as "All channels are currently in use. Please operate the explanation request button again later." At the step S46, it is determined whether or not a completion of the processing is commanded, and if it is commanded, the flow returns to a step S41 to repeatedly execute the subsequent processing.

Figure 14:
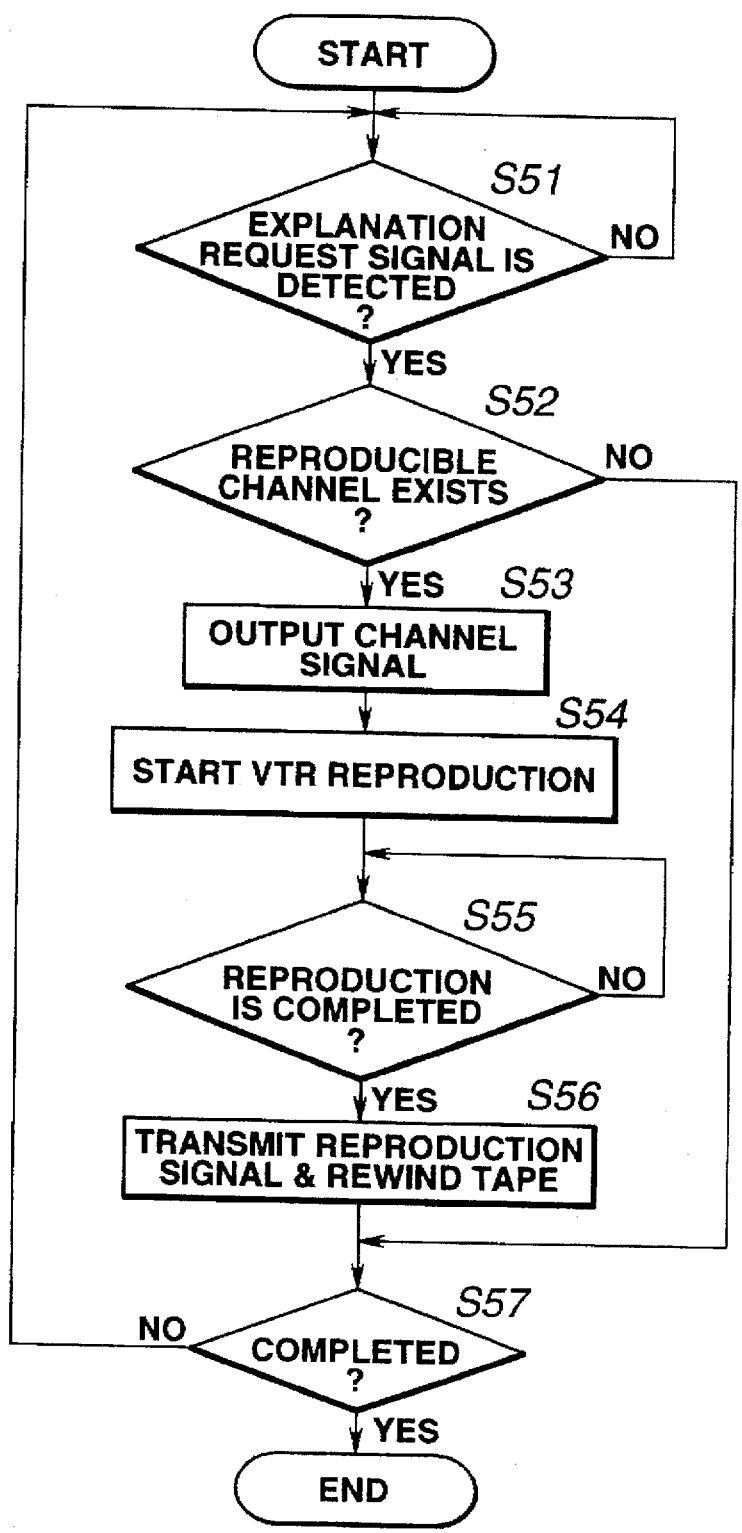
FIG. 14 is a flow chart explaining the operation of the image generating device 61 in the embodiment in FIG. 11.

On the other hand, in the image generating device 61, as shown in FIG. 14, first at a step S51, a wait is done until the explanation request signal is detected. That is, when operating the explanation request button 52, the spectacle-type display 51 outputs the explanation request signal on the carrier wave with the frequency f0 (step S42 in FIG. 13). When this signal is generated, the transmitter-receiver circuit 112 receives the signal through the antenna 111, the demodulated signal being supplied to the detector circuit 113. When detecting the explanation request signal out of the demodulated signal, the detector circuit 113 supplies the detected signal to the control circuit 114.

When receiving the input of this detected signal, the control circuit 114 determines whether or not the reproducible VTR (unused VTR) 117 exists. If the unused VTR 117-1 exists, the channel signal corresponding to the channel of the VTR 117-1 is output. That is, the control circuit 114 controls the generator circuit 115 to produce a signal indicative of the vacant channel, which is output from the transmitter-receiver circuit 112 through the antenna 111 on the carrier wave with the frequency f0. As described above, this signal is detected by the detector circuit 94 of the spectacle-type display 51.

The flow then proceeds to a step S54 where reproduction of the exhibit explanation at the VTR 117-1 with the channel corresponding to the channel signal output at the step S53 is started. That is, the control circuit 114 starts reproduction (play mode) at the VTR 117-1 with the corresponding channel, that reproduced signal being output from the transmitter-receiver circuit 118-1 through the antenna 119-1 on the carrier wave with the frequency f1. This signal is received by the transmitter-receiver circuit 93 of the spectacle-type display 51, the image signal being supplied to the LCDs 12 and the vocal signal being supplied to the earphones 31.

Next, the flow proceeds to a step S55 where a wait is done until a reproduction of the VTR 117-1 is completed. Upon a reproduction completed, the flow proceeds to a step S56 where the reproduction completion signal is transmitted, and the magnetic tape is rewound to the start point. This reproduction completion signal is output from the transmitter-receiver circuit 118-1 through the antenna 119-1 on the carrier wave with the frequency f1.

Next, the flow proceeds to the step S57 where if a completion of the processing is not commanded, the flow returns to the step S51 to repeatedly execute the subsequent processing.

At the step S52, if it is determined that the reproducible channel (vacant channel) does not exist, the flow proceeds to a step S57, whereas if a completion of the processing is not commanded, the flow returns to the step S51. In such a way, in this embodiment, the vacant channel is searched and allocated automatically.

Figure 15:
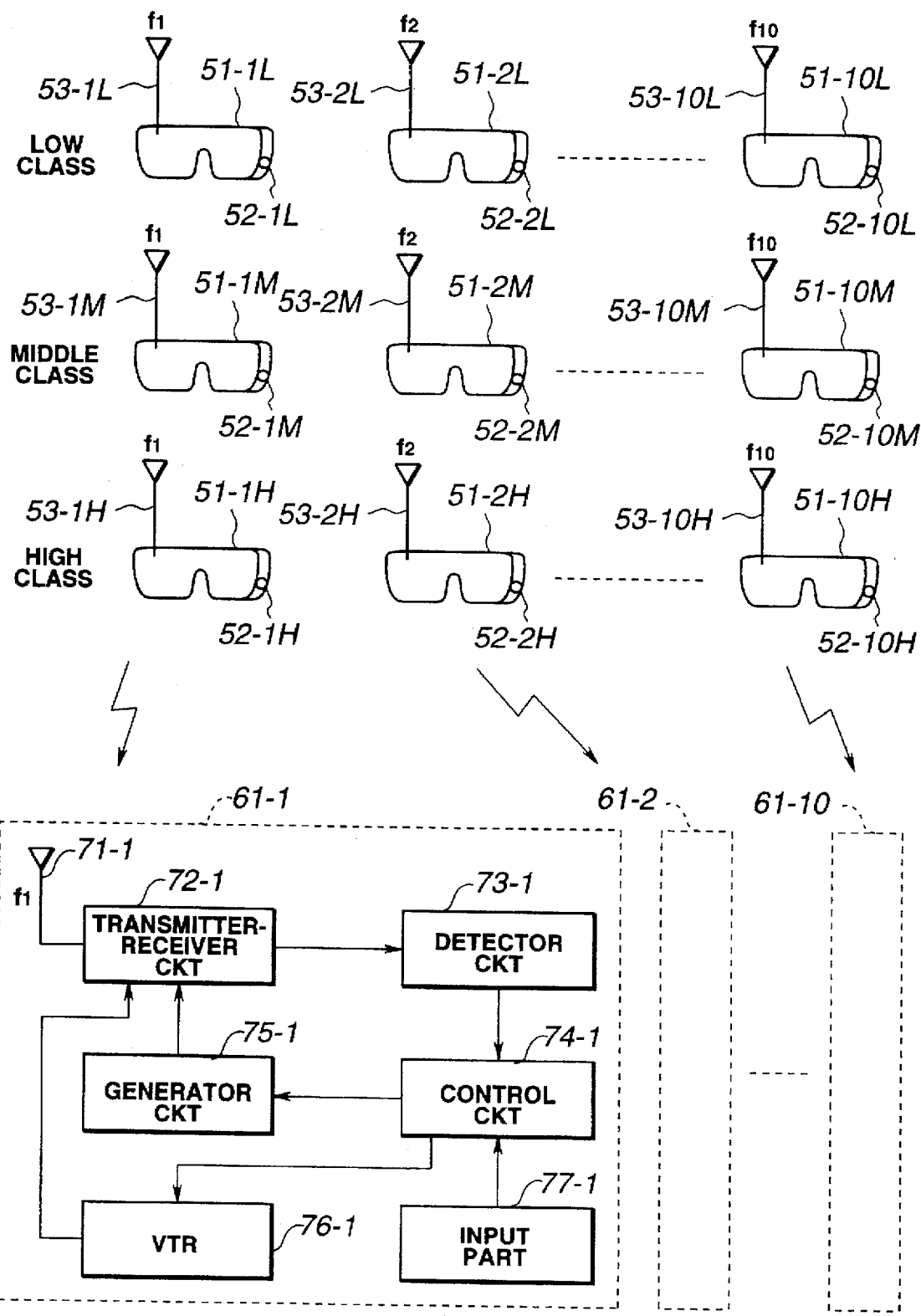
FIG. 15 is a block diagram showing the constitution of another embodiment of a system for explaining an exhibit of the present invention.

FIG. 15 shows another embodiment of a system for explaining an exhibit. In this embodiment, three kinds of low, middle and high classes of spectacle-type displays 51-1L, 51-1M, 51-1H are provided as the spectacle-type display 51-1 corresponding to the frequency f1. Each glass corresponds to a different level of explanation of the exhibit. For example, the low class might be suitable for a child or someone with little or no understanding of the exhibit. High class might be suitable for a more advanced student of the subject of the exhibit. Middle class would fall between these extremes. Of course, more or fewer classes could be provided without departing from the invention.

The constitution of the spectacle-type displays 51-1L, 51-1M, 51-1H is the same as a case shown in FIG. 2, and the constitution of the image generating device 61-1 is the same as a case shown in FIG. 1.

Figure 16:
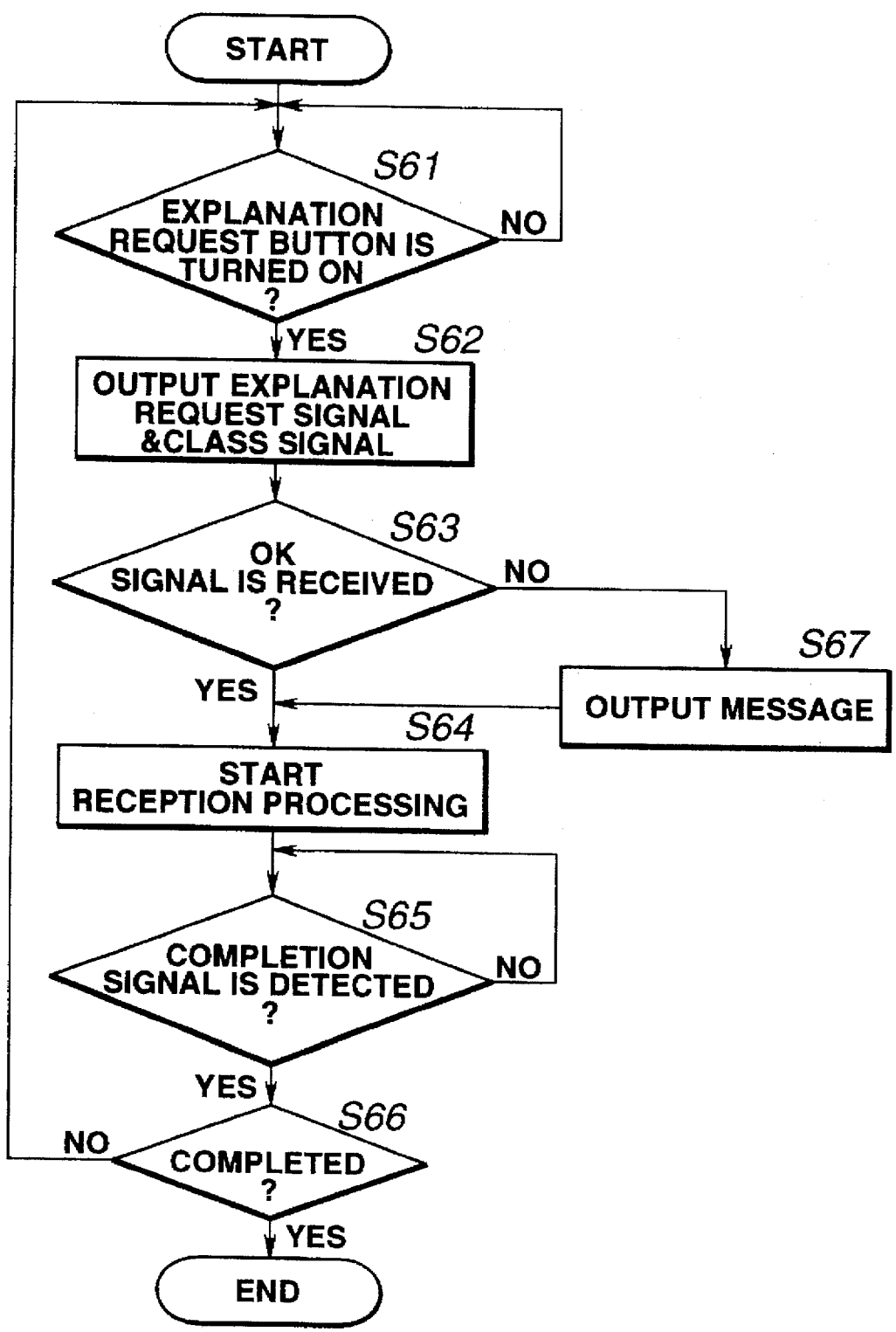
FIG. 16 is a flow chart explaining the operation of the spectacle-type display 51 in the embodiment in FIG. 15.

Next, its operation will be explained. The operation of the spectacle-type displays 51-1L, 51-1M, 51-1H is shown in a flow chart in FIG. 16. The operation from a step S61 to a step S67 is essentially the same as the processing from the step S1 to the step S7 as shown in FIG. 4.

That is, when operating the explanation request button 52 at a step S61, the explanation request signal is output at a step S62. In that case, the frequency f1 of the carrier wave is varied with the channels, however, the frequency is the same in each channel with the classes being different. Thus, at the step S62, a class signal is also output in addition to the explanation request signal.

From step S63 to step S67, when the OK signal on the carrier wave with that frequency is received, a processing for receiving the image signal which is transmitted hereafter is executed. On the other hand, the image generating device 61-1 executes a processing as shown in a flowchart in FIG. 17. The processing from step S71 to step S77 is essentially the same as a processing from the step S11 to the step S17. However, a processing at a step S71 and a step S74 is slightly different from a processing at the step S11 and the step S14 in FIG. 5.

That is, at the step S71, since the explanation request signal and the class signal are output at the step S62, a wait is done until the two are detected. When both signals are detected, it is determined, at a step S72, whether or not the VTR 76-1 with the corresponding channel is in reproduction. If it is not in reproduction, at a step S73, the OK signal is output. At a step S74, a reproduction of the VTR is started. Before a reproduction, a position where information on the class corresponding to the class signal detected at the step S71 is recorded is put at the head.

Figure 18:
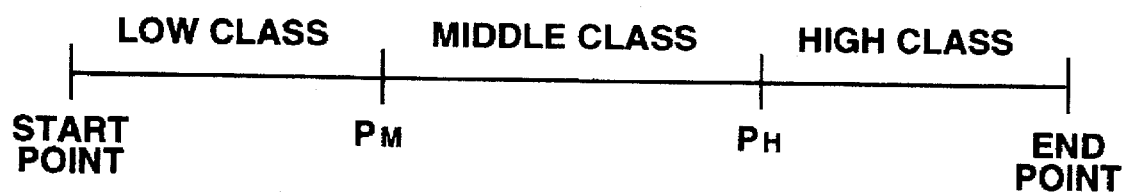
FIG. 18 is a view explaining the information recording state of a VTR 76 in the embodiment in FIG. 15.

Specifically, information on the low, middle and high classes are divisionally recorded on the magnetic tape accommodated in the VTR 76-1 from the start point to the end point as shown in FIG. 18. When the class signal as received is indicative of the low class, its reproduction start point is the start point. Therefore, in this case, a reproduction can be started immediately.

However, when the class signal is of the middle class, the magnetic tape is quickly sent up to a point PM from which information on the middle class is recorded. Moreover, when the class signal is indicative of the high class, the magnetic tape is quickly sent up to a point PH which is a recording start point of the image signal of the high class. In accordance with the class, a reproduction is started from the point PM of the point PH. Those skilled in the art will understand that these points could be directly addressed when a video disk or other randomly accessible source is used.

Next, the flow proceeds to a step S75 where a wait is done until a reproduction is completed. Upon a reproduction completed, at a step S76, the reproduction completion signal is transmitted to rewind the magnetic tape to the start point. Further, the flow proceeds to a step S77 where if a completion of the processing is not commanded, the flow returns to the step S71 to repeatedly execute the subsequent processing.

At the step S72, if it is determined that the VTR 76 with the channel detected at the step S71 is in reproduction, even if the class in reproduction is any of the low, middle and high classes, the flow proceeds to the step S75 where a wait is done until a reproduction is completed. That is, in this embodiment, in case the VTR 76 with the corresponding channel is in the unused state, information on the corresponding class is reproduced, whereas in case of being in use, even if the class in reproduction has information on the non-corresponding class, that information is also provided simultaneously to an user who operates the explanation request button 52 now.

Figure 19:
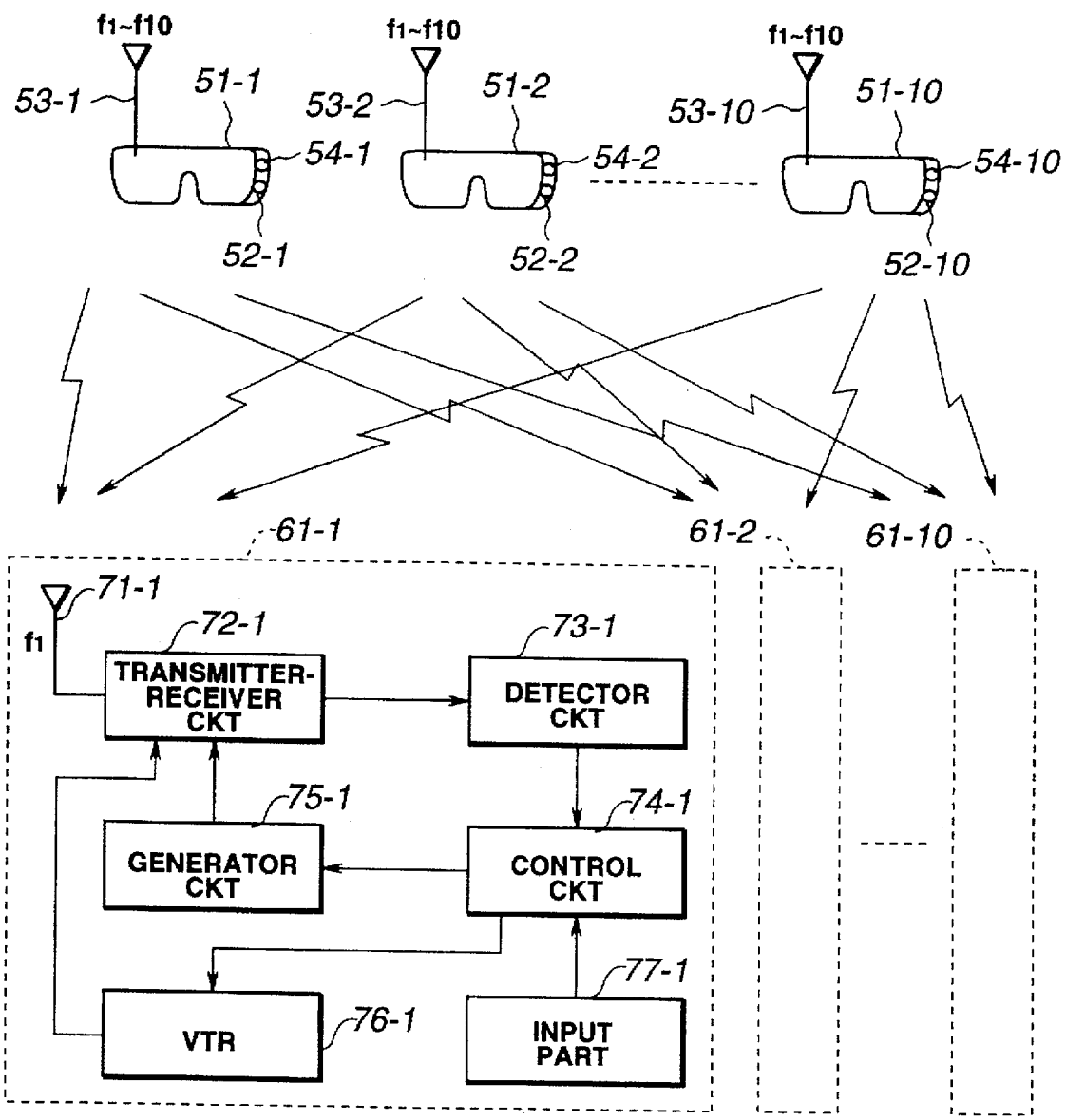
FIG. 19 is a block diagram showing another embodiment of a system for explaining an exhibit of the present invention.
Figure 20:
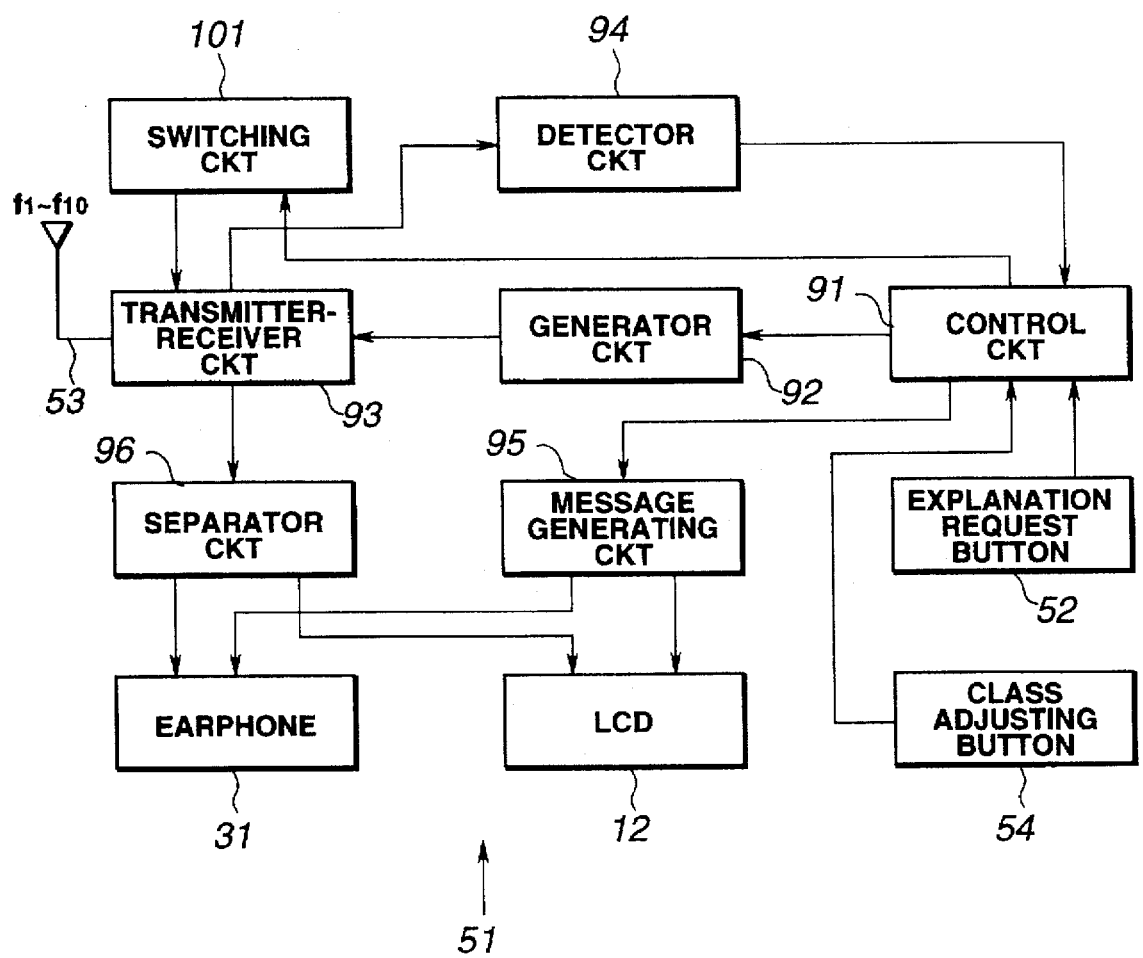
FIG. 20 is a block diagram showing the spectacle-type display 51 in the embodiment in FIG. 19.

FIG. 19 shows still another embodiment of a system for explaining an exhibit. In this embodiment, the spectacle-type display 51-1 is further provided with a class adjusting button 54-1. The constitution of the spectacle-type display 51 is the same as a case in FIG. 7. Therefore, the detailed constitution of the spectacle-type display 51-1 is as shown in FIG. 20.

The constitution of the image generating device 61-1 in this embodiment is the same as a case in FIG. 7.

Figure 21:
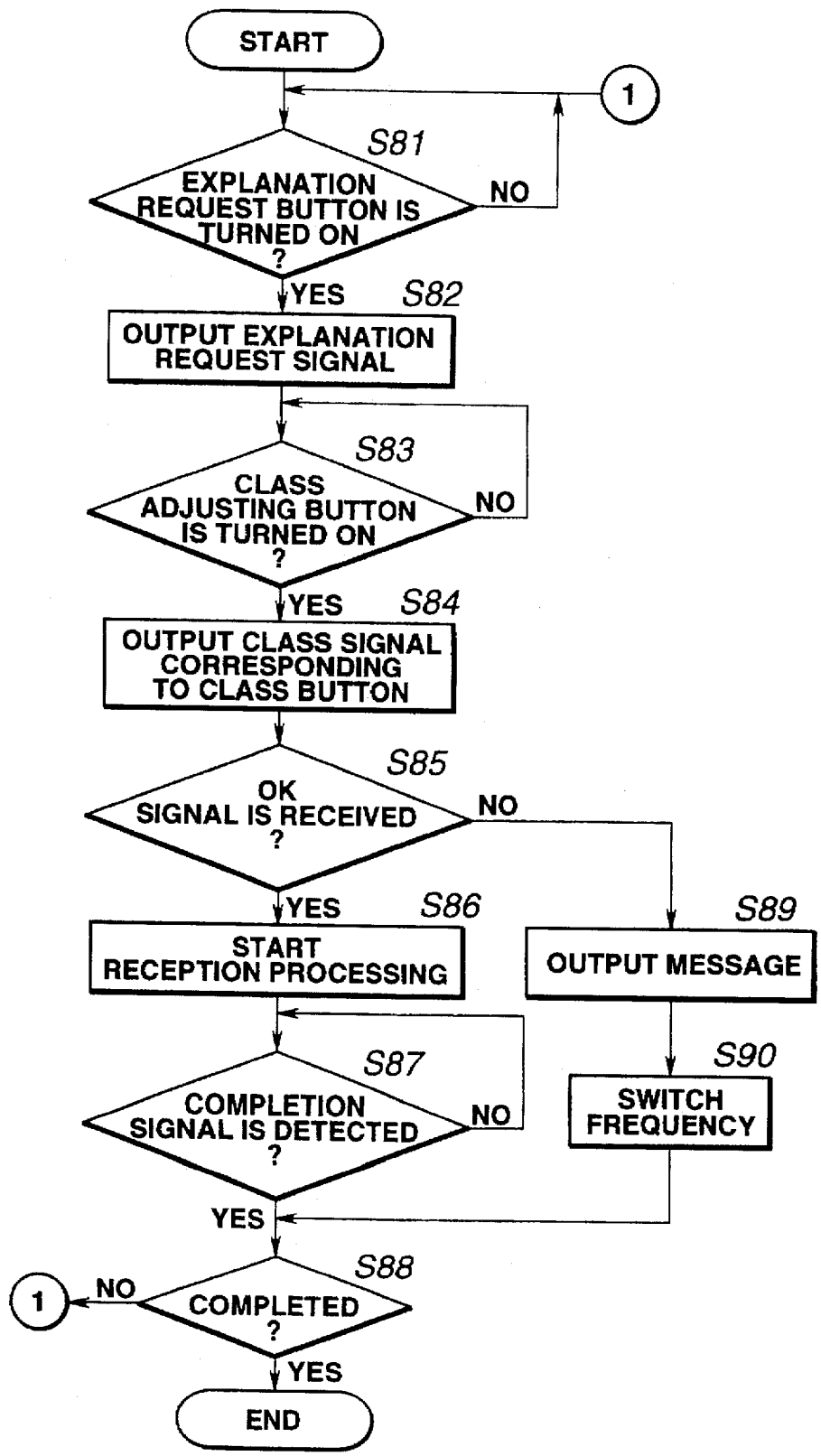
FIG. 21 is a flowchart explaining the operation of the spectacle-type display 51 in the embodiment in FIG. 19.

Referring next to a flowchart in FIG. 21, the operation of the spectacle-type display 51-1 in this embodiment will be explained. First, at a step S81, a wait is done until the explanation request button 52-1 is turned on. When the explanation request button 52-1 is turned on, the flow proceeds to a step S82 where the explanation request signal is output. That is, when operating the explanation request button 52, the control circuit 91 controls the generator circuit 92 to generate the explanation request signal. This explanation request signal is modulated in frequency at a predetermined frequency f1 by the transmitter-receiver circuit 93, then output through the antenna 53 as a radio wave.

Next, the flow proceeds to a step S83 where after outputting the explanation request signal, a wait is done until a predetermined time is elapsed. The user operates the class adjusting button 54 during the predetermined time so as to designate one of the low, middle and high classes.

When an elapse of the predetermined time is detected at the step S83, the flow proceeds to a step S84 where an output processing of the class signal corresponding to the operation of the class adjusting button 54 is executed. That is, the control circuit 91 makes the generator circuit 92 generate the class signal corresponding to the operation of the class adjusting button 54, which is output from the transmitter-receiver circuit 93 through the antenna 5 on the carrier wave with the frequency f1.

Next, the flow proceeds to a step S85 where a wait is done until the OK signal is transmitted from the image generating circuit 61-1. At the step S85, when the OK signal is detected, the flow proceeds to a step S86 where a reception of the image signal as transmitted on the carrier wave with the frequency f1 is started. That is, the image generating device 61-1 outputs the OK signal, then the image signal which is received At a step S87, a wait is done until the reproduction completion signal is detected. Upon the reproduction completion signal detected, the flow proceeds to a step S88 where if a completion of the processing is not designated, the flow returns to the step S81 to repeatedly execute the subsequent processing.

At the step S85, when it is determined that the OK signal is not received, the flow proceeds to a step S89 where a message output processing is executed. Specifically, at this time, the message generating circuit 95 outputs an message such that "This channel is in use now. For using the other channel, please operate the explanation request button again". At a step S90, a frequency switching processing is executed. That is, the switching circuit 101 is controlled by the control circuit 91 to switch the frequency of the carrier wave output by the transmitter-receiver circuit 93 to the other frequency.

Next, the flow proceeds to a step S88 where if a completion of the processing is not commanded, the flow returns to the step S81 to repeatedly execute the subsequent processing.

Figure 22:
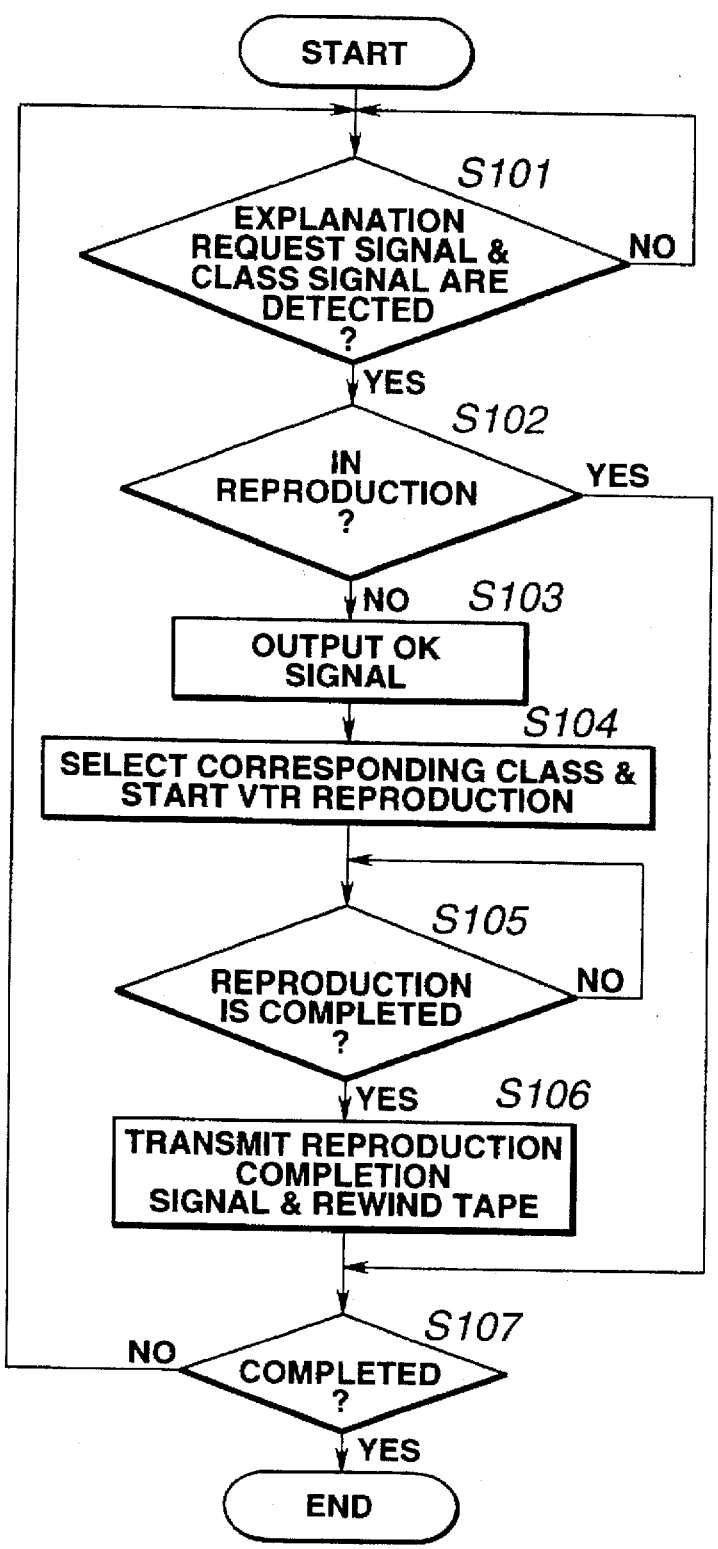
FIG. 22 is a flowchart explaining the operation of the image generating device 61 in the embodiment in FIG. 19.

On the other hand, the image generating device 61-1 carries out the operation as shown in a flowchart in FIG. 22. A processing from a step S101 to a step S107 in FIG. 22 is essentially the same as a processing from the step S71 to the step S77. That is, at a step 101, when the explanation request signal and the class signal are detected, the flow proceeds to a step S102 where it is determined whether or not the VTR 76-1 with the corresponding channel is in reproduction. If it is not in reproduction, the flow proceeds to a step S103 where the OK signal is output.

Further, at a step S104, the corresponding class is selected to start a reproduction. At a step S105, a wait is done until a reproduction is completed. Upon a reproduction completed, the flow proceeds to a step S106 where the reproduction completion signal is transmitted, and the tape is rewound to the start point. And, at a step S107, when it is determined that a completion of the processing is not commanded, the flow returns to the step S101 to repeatedly execute the subsequent processing.

Figure 17:
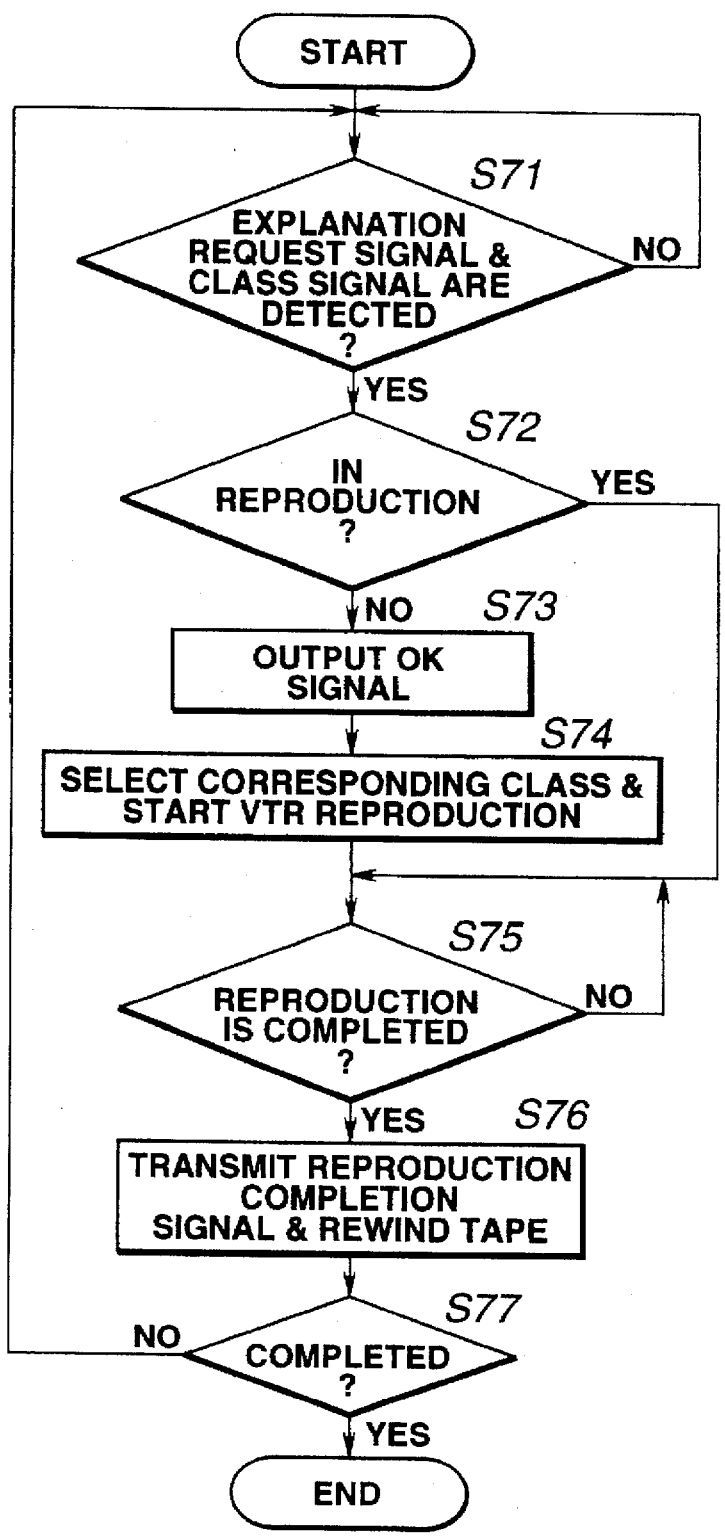
FIG. 17 is a flow chart explaining the operation of the image generating device 61 in the embodiment in FIG. 15.

Note that at the step S102, if it is determined that the corresponding VTR 76-1 is in reproduction, the flow proceeds to the step S72 or the step S75 in the flowchart in FIG. 17 so that the other user can also watch and listen to the signal actually in reproduction (the class failing to always correspond thereto), whereas in the embodiment in FIG. 22, the flow proceeds from the step S102 to the step S107 where if a completion of the processing is not commanded, the flow returns to the step S101 to execute the processing from the beginning.

That is, in case the corresponding channel is in use, the user executes repeatedly the action for operating the explanation request button 52-1. When the vacant channel is found, the image signal of the class as designated can be received on this channel.

Figure 23:
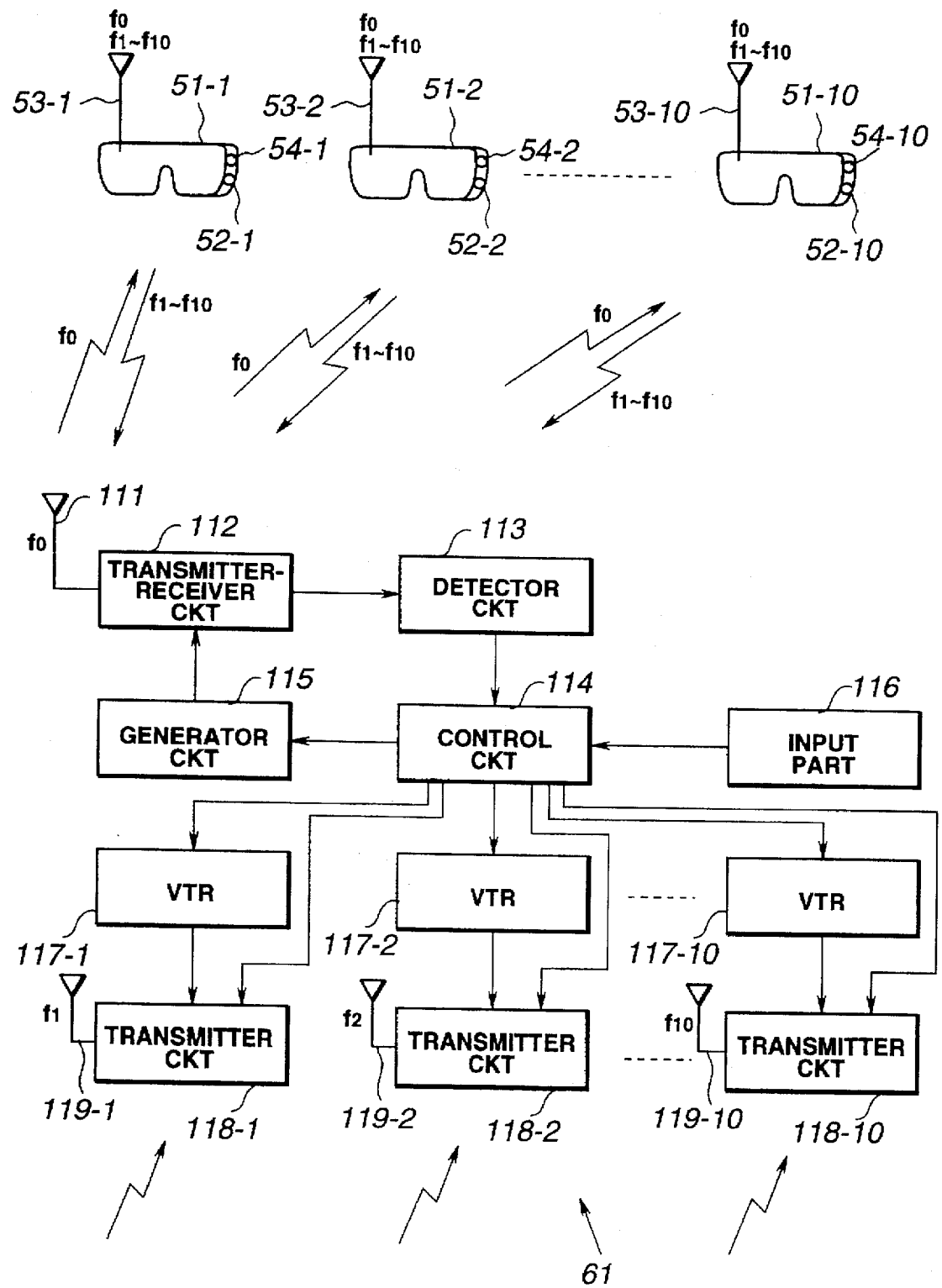
FIG. 23 is a block diagram showing another embodiment of a system for explaining an exhibit of the present invention.
Figure 24:
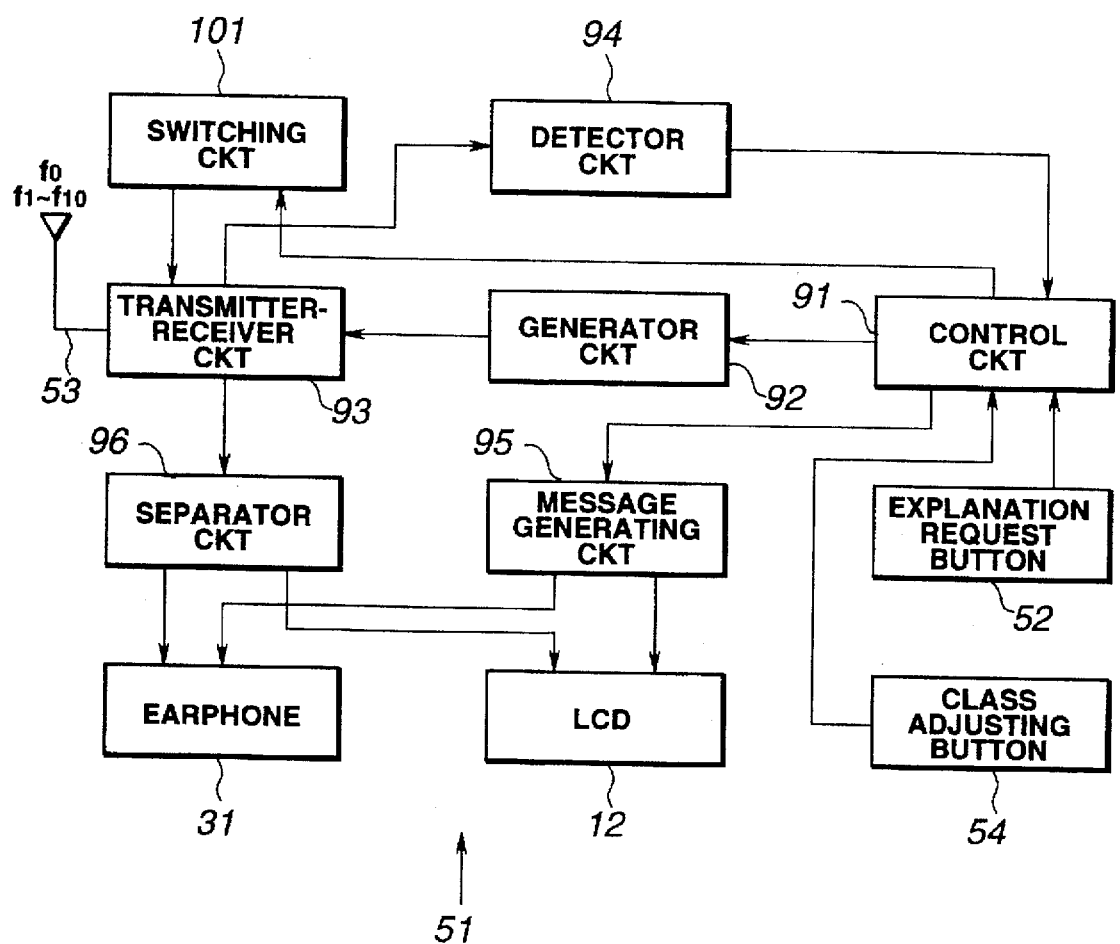
FIG. 24 is a block diagram showing the spectacle-type display 51 in the embodiment in FIG. 23.

FIG. 23 shows still another embodiment. In this embodiment, except that the spectacle-type display 51-1 is provided with the class adjusting button 54-1, the constitution is the same as a case in FIG. 11. Therefore, the spectacle-type display 51-1 in this embodiment is constructed as shown in FIG. 24.

Moreover, the image generating device 61-1 in this embodiment is constructed in the same way as a case in FIG. 11.

Figure 25:
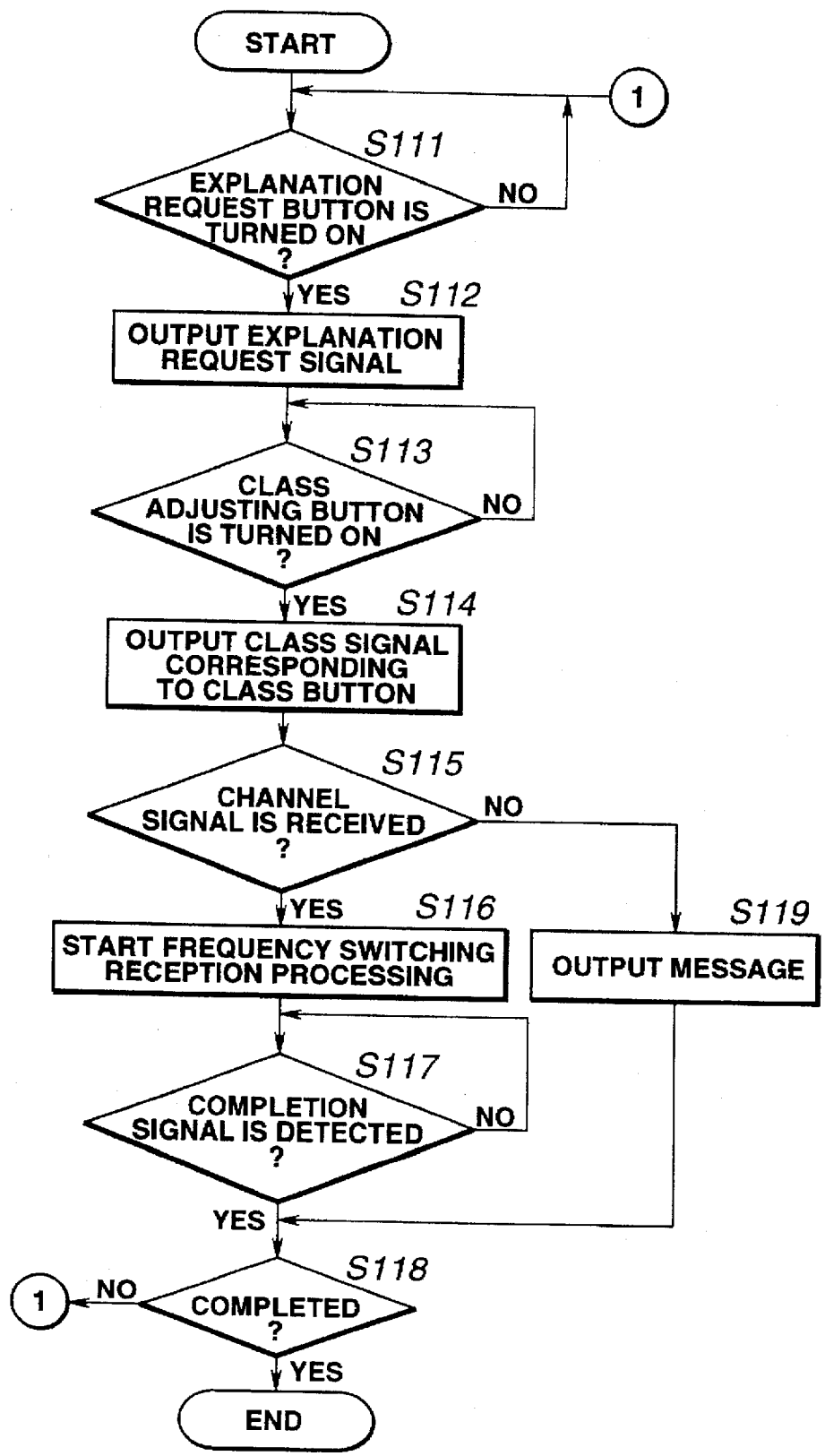
FIG. 25 is a flow chart explaining the operation of the spectacle-type display 51 in the embodiment in FIG. 23.

FIG. 25 shows an example of the operation of the spectacle-type display 51 in this embodiment. First, at a step S111, a wait is done until the explanation request button 52-1 is turned on. When this button is turned on, the flow proceeds to a step S112 where the explanation request signal is output. Next, the flow proceeds to a step S113 where a wait is done until a predetermined time elapses. Upon a lapse of the predetermined time, the flow proceeds to a step S114 where the class signal corresponding to the class adjusting button 54 is output. The above processing is the same as a processing from the step S81 to the step S84 in FIG. 21.

Next, the flow proceeds to a step S115 where it is determined whether or not the channel signal is received from the corresponding image generating device 61-1. That is, when the explanation request signal and the class signal as output at the step S112 and the step S114 are detected, the image generating device 61-1 searches the vacant channel. When the vacant channel exists, the channel signal of the vacant channel is output (step S123 in FIG. 26).

When the spectacle-type display 51-1 receives this channel signal at the step S115, the flow proceeds to a step S116 where a frequency switching processing is carried out, and a reception processing is started. That is, the explanation request signal and the class signal at the step S112 and the step S114 are output from the transmitter-receiver circuit 93 of the spectacle-type display 51-01 on the carrier wave with the frequency f0. Also, at the step S123, the image generating device 61-1 outputs the channel signal on the carrier wave with the frequency f0. Therefore, the transmitter-receiver circuit 93 receives the carrier wave with the frequency f0, and the channel signal is detected by the detector circuit 94.

The frequency f1 of the carrier wave which is obtained by reproducing through the image generating device 61-1 the VTR 117-1 for reproducing the image signal corresponding to the channel signal, and output from the transmitter circuit 118-1 through the antenna 119-1 is different from the frequency f0. Thus, the switching circuit 101 controls the transmitter-receiver circuit 93 to be capable of receiving this carrier wave with the frequency f1.

The signal as received by the transmitter-receiver circuit 93 undergoes FM demodulation, then it is supplied to the separator circuit 96 so as to separate into the image signal and the vocal signal, which are supplied to the LCDs 12 and the earphones 31, respectively.

Next, the flow proceeds to a step S117 where a wait is done until the reproduction completion signal is detected. Upon the reproduction completion signal detected, the flow proceeds to a step S118 where if a completion of the processing is not commanded, the flow returns to the step S111 to repeatedly execute the subsequent processing.

At the step S115, when it is determined that the channel signal cannot be received, the flow proceeds to a step S119 where a message output processing is executed. That is, the control circuit 91 controls the message generating circuit 95 to output a message such as "All channels are in use now. Please operate the explanation request button again later."

At the step S118, when it is determined that a completion of the processing is not commanded, the flow returns to the step S111 where a wait is done until the explanation request button 52-1 is operated again. When it is operated, the same processing is executed repeatedly.

Figure 26:
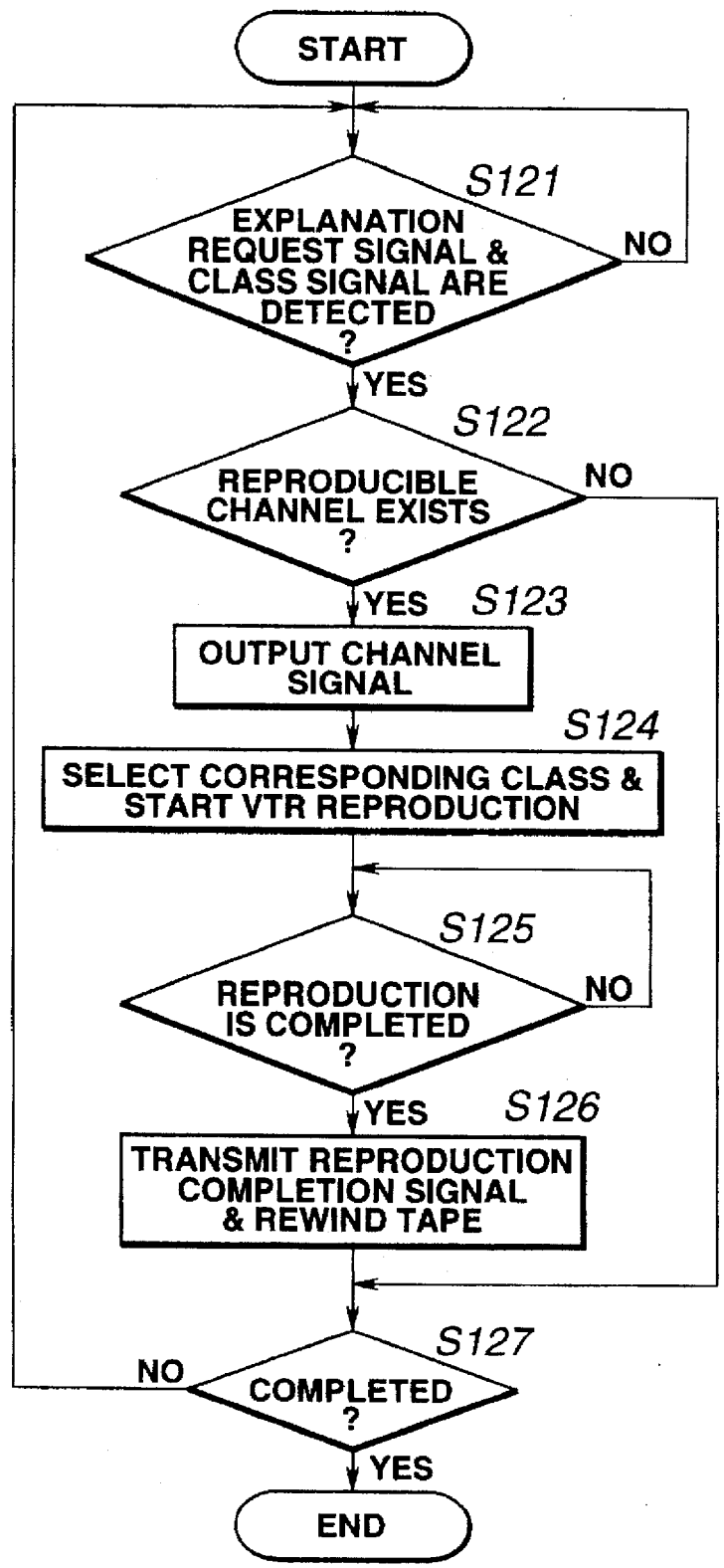
FIG. 26 is a flow chart explaining the operation of the image generating device 61 in the embodiment in FIG. 23.

On the other hand, in the image generating device 61-1, a processing as shown in FIG. 26 is executed. First, at a step S121, a wait is done until the explanation request signal and the class signal as generated by the spectacle-type display 52-1 at the steps S112 and S114 are detected. When they are detected, the flow proceeds to a step S122 where the reproducible channel is searched. When the reproducible channel (vacant channel) is found, the flow proceeds to the step S123 where the channel signal indicative that which is that channel is output. That is, the control circuit 114 controls the generator circuit 115 to generate the channel signal. The transmitter-receive circuit 112 carries out frequency modulation of this signal on the carrier wave with the frequency f0, which is output through the antenna 111. This signal is detected in the spectacle-type display 51 at the step S115 in FIG. 25.

Next, the flow proceeds to a step S124 where the start point of the class corresponding to the class signal of that channel detected at the step S121 is searched. That is, the control circuit 114 controls the VTR 117-1 of the corresponding channel to quickly send the magnetic tape to the recording start point from which information on the low, middle or high class is recorded. Reproduction of the exhibit explanation is started from that position.

This reproduced signal is supplied to the transmitter circuit 118-1, which is output from the antenna 119-1 on the carrier wave with the frequency f1. This signal is received by the spectacle-type display 51 at the step S116.

Next, at a step S125, a wait is done until a reproduction is completed. Upon a reproduction completed, the flow proceeds to a step S126 where the reproduction completion signal is output from the transmitter circuit 118-1, and the VTR 117-1 is controlled to rewind the magnetic tape to the start point.

Next, the flow proceeds to a step S127 where if a completion of the processing is not commanded, the flow returns to the step S121 to repeatedly execute the subsequent processing.

At the step S122, if the reproducible channel is not found, i.e., the vacant channel does not exist, the flow proceeds to the step S127 where if a completion of the processing is not commanded, the flow returns to the step S121 to repeatedly execute the subsequent processing.

Having explained above the present invention in connection with an example in which the present invention is applied to a system for providing information on an exhibit in museums or art galleries, the present invention can be applied to the system for explaining an exhibit in other places.

As described above, according to the system for explaining an exhibit of the present invention, since the outputs of predetermined frequencies are received by a plurality of spectacle-type displays so as to display in display portions of the image of the exhibit, each user can receive an explanation of the exhibit at his own pace.

In the system for explaining an exhibit having the above constitution, the image of the exhibit as output from the image generating device is displayed on the display portions of the spectacle-type displays. Therefore, a relatively many persons can obtain information on the exhibit at their own pace.

Many variations of the present invention will occur to those skilled in the art. For example, other modulation schemes can be used and alternative sources of video can be used. The receiver and transmitter of the spectacle-type display can be fabricated as a part of the display itself, or it may be part of a separate transceiver which is hand held or carried on the belt of the user. More or fewer classes of explanation may be provided and these classes of explanation may be in the form of separate programs or continuations of common program material (as in FIG. 18). Other variations will become apparent to those skilled in the art.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A system for explaining an exhibit including a plurality of exhibit elements, comprising in combination:

a plurality of installed image generating devices, each operatively associated with at least one exhibit element for outputting an image associated with the exhibit element at predetermined frequencies; and a plurality of spectacle-type displays, wherein the outputs of said image generating devices at said predetermined frequencies are received by said plurality of spectacle-type displays so as to display in display portions thereof said image of the exhibit element.

2. A system for explaining an exhibit as specified in claim 1, wherein said predetermined frequencies are varied with said plurality of image generating devices.

3. A system for explaining an exhibit as specified in claim 2, wherein said predetermined frequencies are selected by persons who use said plurality of spectacle-type displays, respectively.

4. A system for explaining an exhibit as specified in claim 2, wherein said image generating devices automatically select unused ones of said predetermined frequencies.

5. A system for explaining an exhibit as specified in claim 2, said image of the exhibit is provided to be varied with classes, and said classes are determined with said spectacle-type displays.

6. A system for explaining an exhibit as specified in claim 2, wherein said image of the exhibit varies according to predetermined classes, and said classes are selectable by persons who use said spectacle-type displays.

7. A system for explaining an exhibit as specified in claim 1, wherein said spectacle-type displays are switchable between either of a state wherein the user views said display portion and a state wherein the user can view his surroundings.

8. A system for explaining an exhibit having a number of exhibit elements, comprising:

a plurality of installed image generating devices, each operationally linked to an exhibit element and a plurality of portable display devices;

each of said plurality of image generating devices comprising:

image generating means for generating an image related to the exhibit element; and a transmitter means for outputting said generated image at a predetermined frequency, each of said plurality of portable display devices comprising:

a receiver means for receiving the image related to the exhibit element transmitted at the predetermined frequency from said image generating device; and display means for displaying the image received by said receiver means on a display unit provided thereon.

9. A system for explaining an exhibit of claim 8, wherein said predetermined frequency is varied with said plurality of image generating devices.

10. A system for explaining an exhibit of claim 9, wherein said image generating means further generates a sound to explain the exhibit.

11. A system for explaining an exhibit of claim 10, wherein each of said plurality of portable display devices further comprises a transmission request signal generating means for generating a signal by user's request to request said image generating device to transmit the image related to the exhibit;

said receiver means has the transmitting function and transmits the transmission request signal to said image generating device, each of said image generating devices further comprises a signal detecting means for detecting the transmission request signal received from said portable display device;

said image generating means generates predetermined image corresponding to the detected transmission request signal.

12. A system for explaining an exhibit of claim 11, wherein said image generating device further comprises a judging means for judging whether or not said image generating device is used by other user when the transmission request signal is detected;

and a signal generating means for generating a signal to indicate that said image generating device is in the unused state, said transmitter means transmits the signal to said portable display device.

13. A system for explaining exhibit of claim 12, wherein said display device further comprising a means for detecting the signal received from said image generating device; and a message generating means for generating a message to indicate that the image related to the exhibit is received by other user when the signal is not received, a display means displays the message on the display unit.

14. A system for explaining an exhibit of claim 13, wherein said portable display device further comprising a frequency switching means for switching the frequency to the frequency of other image generating device when the signal is not received.

15. A system for explaining an exhibit of claim 11, wherein said image generating device further comprises a judging means for judging whether or not said image generating device in the unused state exists when the transmission request signal is detected;

and a signal generating means for generating a signal to indicate that said image generating device in the unused state exists, said transmitter means transmits the signal to said portable display device.

16. A system for explaining an exhibit of claim 15, wherein said portable display device further comprises a means for detecting the signal received from said image generating device;

and a message generating means for generating a message to indicate that the all said image generating devices are in the used state when the signal is not received, said display means displays the message on the display unit.

17. A system for explaining an exhibit of claim 15, wherein sand portable display device further comprises a means for detecting the signal received from said image generating device;

and an automatic selecting means for automatically selecting one of frequencies of image generating devices in the unused state when the signal is received, said display means displays the image corresponding to the frequency selected on the display unit.

18. A system for explaining an exhibit of claim 15, wherein said portable display device further comprises a means for detecting the signal received from said image generating device;

and a selecting means for selecting by user's request one of frequencies of image generating devices in the unused state when the signal is received, said display means displays the image corresponding to the frequency selected on the display unit.

19. A system for explaining an exhibit of claim 10, wherein said image related to the exhibit is varied with a plurality of classes;

said portable display device further comprises a transmission request signal generating means for generating a signal by user's request to request said image generating device to transmit the image related to the exhibit;

and a class signal generating means for generating a class signal indicating which class of image is requested to be transmitted, said receiver means has the transmitting function and transmits the transmission request signal and the class signal to said image generating device, said image generating device further comprises a signal detecting means for detecting the transmission request signal and the class signal received from said portable display device;

said image generating means generates predetermined image corresponding to the detected transmission request signal and the class signal.

20. A system for explaining an exhibit of claim 19, wherein said classes are determined with said portable devices.

21. A system for explaining an exhibit of claim 19, wherein said classes are selected by users of said portable devices.

22. A system for explaining an exhibit of claim 19, wherein said image generating device further comprises a judging means for judging whether or not said image generating device is used by other user when the transmission request signal is detected;

and a signal generating means for generating a signal to indicate that said image generating device is in the unused state, said transmitter means transmits the signal to said portable display device.

23. A system for explaining an exhibit of claim 22, wherein said display device further comprises a means for detecting the signal received from said image generating device;

and a message generating means for generating a message to indicate that the image related to the exhibit is received by other user when the signal is not received, said display means displays the message on the display unit.

24. A system for explaining an exhibit of claim 23, wherein said portable display device further comprises a frequency switching means for switching the frequency to the frequency of other image generating device when the signal is not received.

25. A system for explaining an exhibit of claim 19, wherein said image generating device further comprises a judging means for judging whether or not said image generating device in the unused state exists when the transmission request signal is detected;

and a signal generating means for generating a signal to indicate that said image generating device in the unused state exists, said transmitter means transmits the signal to said portable display device.

26. A system for explaining an exhibit of claim 25, wherein said portable display device further comprises a means for detecting the signal received from said image generating device;

and a message generating means for generating a message to indicate that the all said image generating device are in the used state when the signal is not received, said display means displays the message on the display unit.

27. A system for explaining an exhibit of claim 25, wherein said portable display device further comprises a means for detecting the signal received from said image generating device;

and an automatic selecting means for automatically selecting one of frequencies of image generating devices in the unused state when the signal is received, said display means displays the image corresponding to the frequency selected on the display unit.

28. A system for explaining an exhibit of claim 25, wherein said portable display device further comprises a means for detecting the signal received from said image generating device;

and a selecting means for selecting by user's request one of frequencies of image generating devices in the unused state when the signal is received, said display means displays the image corresponding to the frequency selected on the display unit.

29. A portable display device (PDD) for use in conjunction with an image generator system, including a plurality of installed image generators each operatively associated with one or more exhibit elements, and at least one transmitter, to provide an explanation of said exhibit elements, said PDD comprising in combination:

a receiver for receiving an image related to an exhibit element transmitted over a predetermined communication channel;

a display for displaying the image received by said receiver on a display unit provided thereon;

means for attaching said portable display device to the head of a user; and means for transmitting a signal from said portable display device to said exhibit element associated image generator to initiate transmission of said explanation.

30. The apparatus of claim 29, further comprising means for transmitting a message specifying a class of explanation from said portable display device to said image generator.

31. The apparatus of claim 29, further comprising means for transmitting a signal requesting a change in said predetermined communication channel from said portable display device to said image generator.

* * * * *